(12) United States Patent
Schmidt et al.

(10) Patent No.: US 12,357,145 B2
(45) Date of Patent: Jul. 15, 2025

(54) PAN CLEANING MACHINE AND A METHOD OF OPERATING THE MACHINE TO CLEAN PANS

(71) Applicants: Norman Schmidt, Denman Island (CA); Orlando Janzen, Mission (CA)

(72) Inventors: Norman Schmidt, Denman Island (CA); Orlando Janzen, Mission (CA)

(73) Assignee: Food Machinery Engineering, LMTD, Surrey (CA)

( * ) Notice: Subject to any disclaimer, the term of this patent is extended or adjusted under 35 U.S.C. 154(b) by 1192 days.

(21) Appl. No.: 17/009,566

(22) Filed: Sep. 1, 2020

(65) Prior Publication Data

US 2021/0121041 A1 Apr. 29, 2021

Related U.S. Application Data

(60) Provisional application No. 62/894,915, filed on Sep. 2, 2019.

(51) Int. Cl.
*A47L 15/00* (2006.01)
*A21B 3/16* (2006.01)
(Continued)

(52) U.S. Cl.
CPC ............ *A47L 15/0092* (2013.01); *A21B 3/16* (2013.01); *A46B 13/001* (2013.01);
(Continued)

(58) Field of Classification Search
CPC .... A47L 15/39; A47L 15/245; A47L 15/0092; A47L 15/241; A47L 15/0076; A46B 2200/3006
(Continued)

(56) References Cited

U.S. PATENT DOCUMENTS 4,144,615 A * 3/1979 Hanson ................. A47L 15/245
15/360
4,403,365 A * 9/1983 Hanson .................... A21B 3/16
15/56
(Continued)

FOREIGN PATENT DOCUMENTS

EP 2263944 A1 * 12/2010 ........... B65G 47/252
GB 2561877 A * 10/2018 ............... A46B 3/22
WO WO 2020038893 A1 * 2/2020 ............. A47L 15/24

*Primary Examiner* — Laura C Guidotti
(74) *Attorney, Agent, or Firm* — Tangent Law Group, PLLC; Eric J. Weierstall, esq.

(57) ABSTRACT

The invention is directed to an improved pan cleaning machine that has a cleaning section that comprises a plurality of frames for mounting a sequence of interchangeable modular cleaning mechanisms. It can include quick-release mounting arrangements so that cleaning mechanisms can be quickly changed for cleaning different types of pans or to replace brushes or other wearing parts of cleaning mechanisms when they require replacement. In some embodiments, the frames for mounting the cleaning mechanisms can comprise swing arms so that the cleaning mechanisms can be swung away from the cleaning position so that the cleaning mechanism can be removed and replaced without interrupting the operation of the machine. If the machine is stopped, the swing arm can still be used to facilitate access to the cleaning mechanism to reduce the time needed to complete the maintenance or replacement. This also allows the position of the cleaning mechanism in relation to the baking pans to be adjustable during the cleaning process which can permit increased application of brushing forces or prevent overloading and also permits easy jam removal. In addition, the swing arm makes the pan cleaning machine more adaptable for cleaning pans with different depths and customizable. A method of operation and control, including (Continued)

pre-programmed cleaning cycles and various control paradigms is also provided.

20 Claims, 29 Drawing Sheets

(51) Int. Cl.
*A46B 13/00* (2006.01)
*A46B 13/02* (2006.01)
*A47L 15/24* (2006.01)
*A47L 15/39* (2006.01)
*A47L 15/42* (2006.01)
*A47L 15/46* (2006.01)

(52) U.S. Cl.
CPC ........ *A46B 13/023* (2013.01); *A47L 15/0076* (2013.01); *A47L 15/241* (2013.01); *A47L 15/39* (2013.01); *A47L 15/4282* (2013.01); *A47L 15/46* (2013.01); *A46B 2200/3006* (2013.01); *A47L 2401/04* (2013.01); *A47L 2401/17* (2013.01); *A47L 2401/24* (2013.01)

(58) Field of Classification Search
USPC ..................................... 15/77, 102
See application file for complete search history.

(56) References Cited

U.S. PATENT DOCUMENTS 8,056,699 B2 * 11/2011 Depot ..................... B08B 1/32
198/402
9,873,143 B2 * 1/2018 Arrington ................ B08B 9/30

* cited by examiner

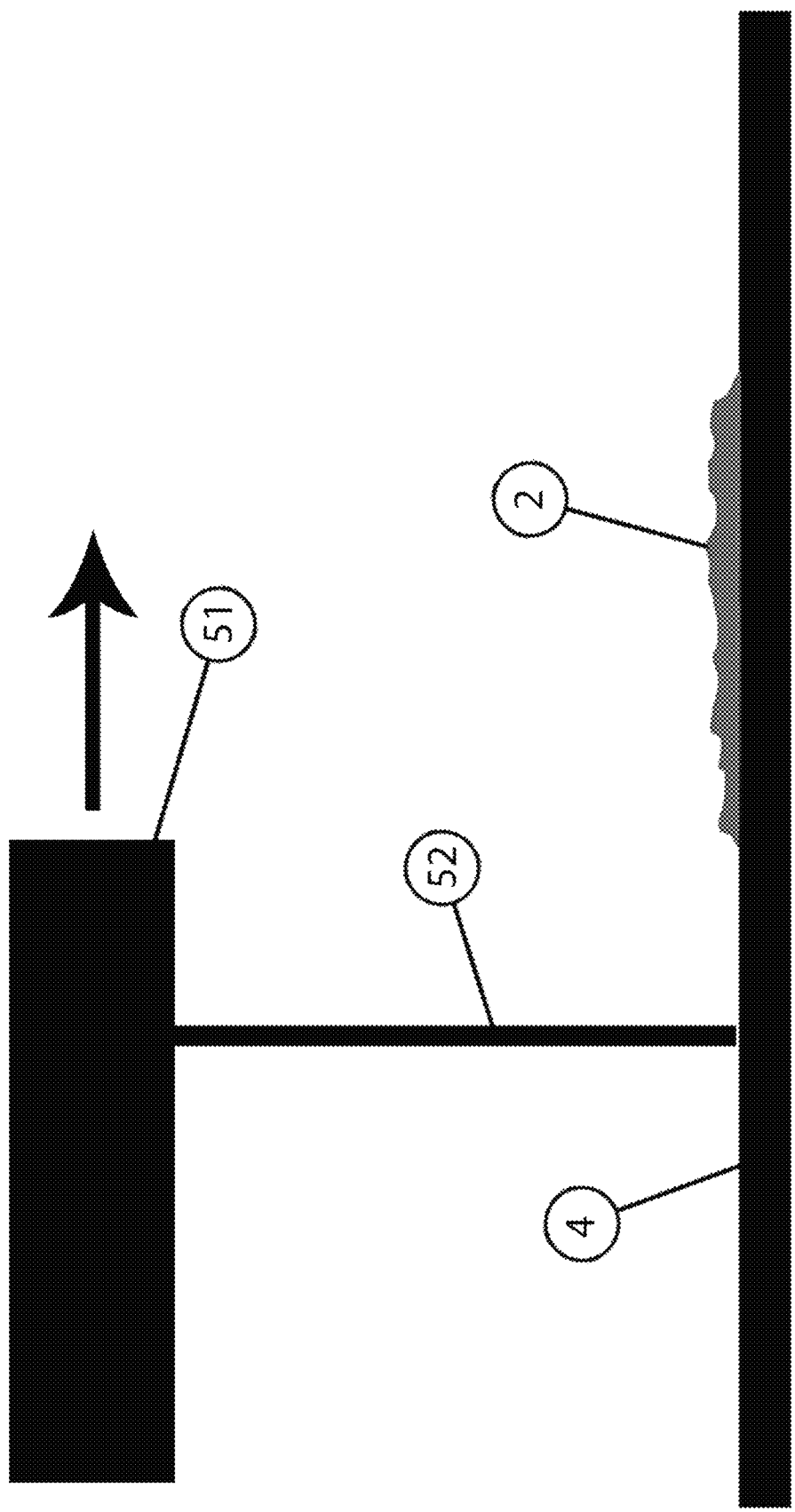

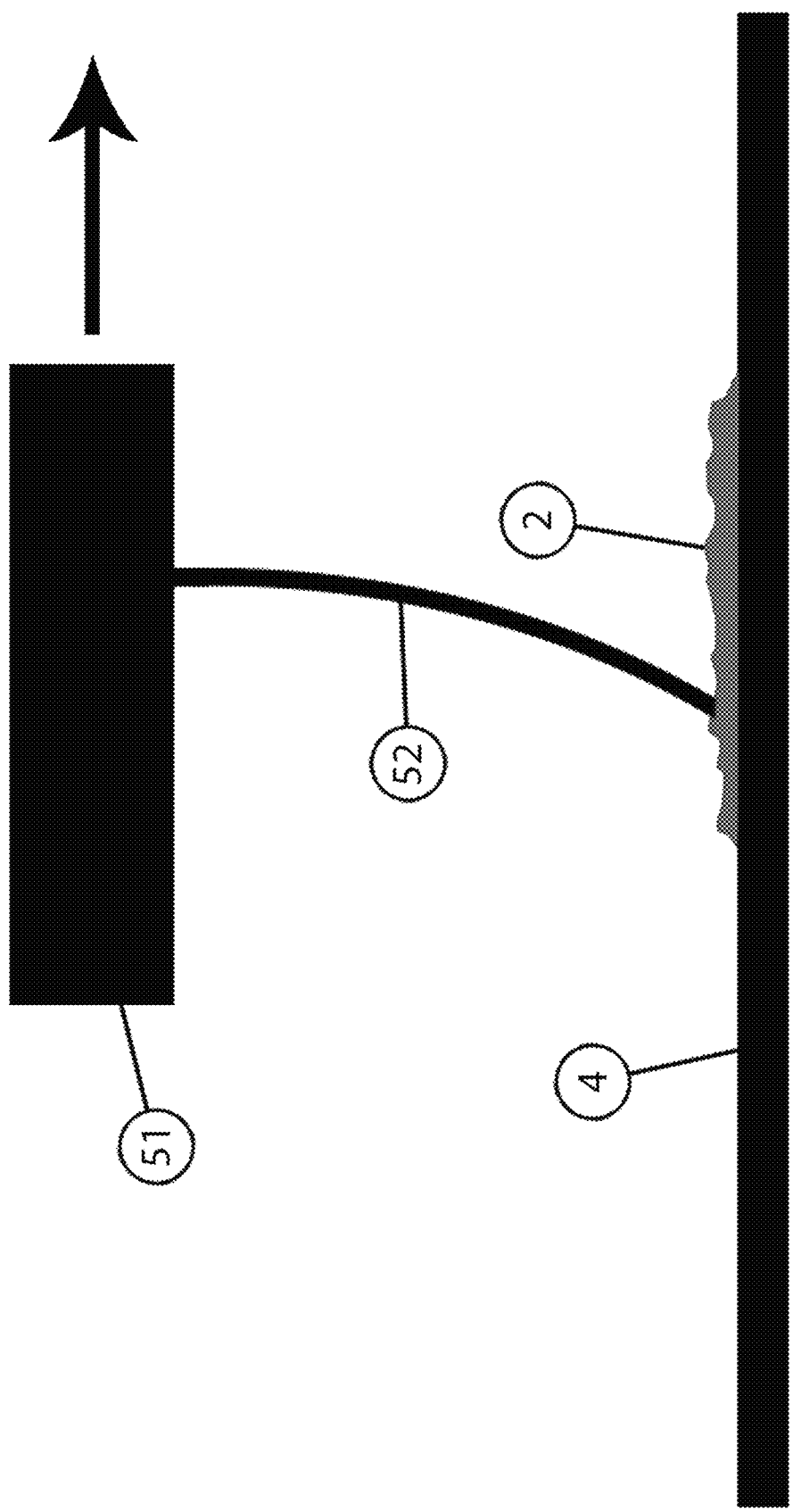

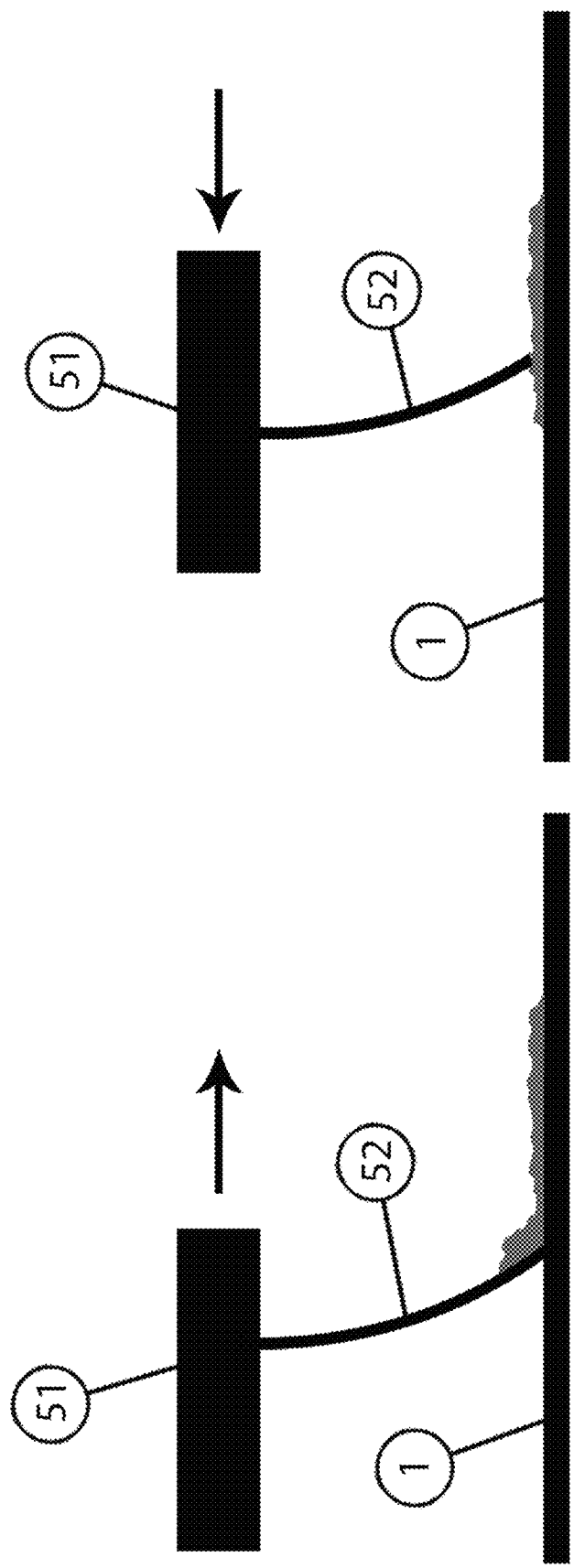

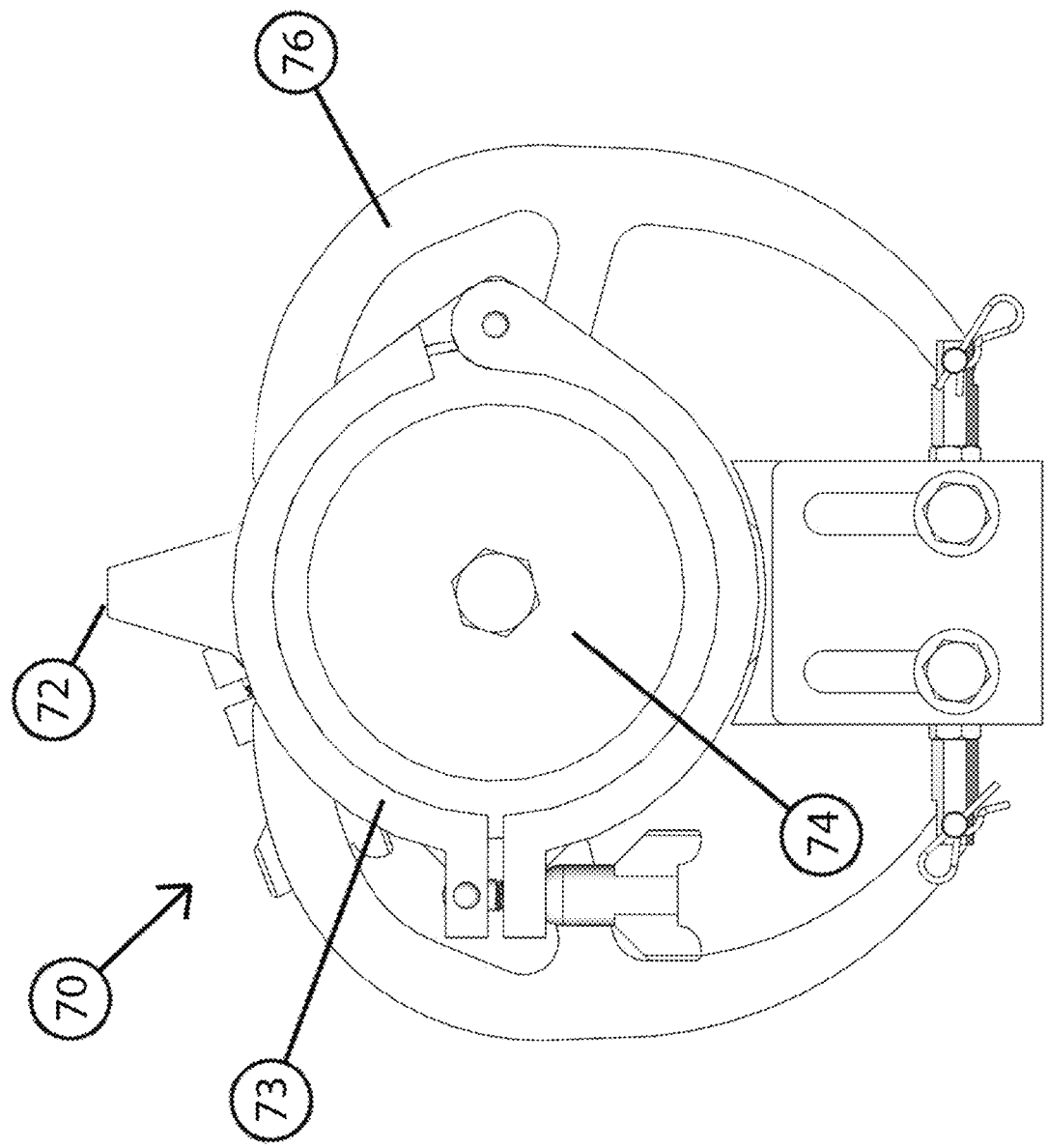

PAN CLEANING MACHINE AND A METHOD OF OPERATING THE MACHINE TO CLEAN PANS

CROSS REFERENCE TO RELATED APPLICATIONS

This application claims the priority of U.S. provisional patent application 62/894,915, filed Sep. 2, 2019, which is incorporated herein by reference.

FIELD OF THE INVENTION

The present application relates to a pan cleaning machine with pans transported on rolling carriages and a method of using such a machine to clean pans. More specifically, the disclosed pan cleaning machine enables a method of continuous automated pan cleaning, and the rolling carriage arrangement enables the pans to be positioned in different orientations more complex than known machines, to facilitate removal of debris from the pans and improve cleaning.

BACKGROUND OF THE INVENTION

Baking pans used in mass production bakeries are an example of an application for the disclosed machine and method of operation. It is not uncommon for modern mass production bakeries to have production rates of 1,600 buns per minute, which amounts to about 33 baking pans each minute, when about 48 buns are baked on each pan. The size of the baking pans and the number of baked products per baking pan can vary between different operations. This non-limiting example is given only to demonstrate the scale of current mass production bakery processes and the number of baking pans that are continuously used in such processes. Even higher baking pan usage rates are possible, depending upon the design of the baking equipment and the product being produced. To keep up with the volume of baking pans employed by modern mass production bakeries, and to ensure that the baking pan cleaning system is not the bottleneck in the baking operation, improvements are needed: (a) to better clean debris left from the baking pans after the baked product has been removed, such debris including, but not limited to seed, cosmetic glaze that is typically used on buns so as to put a shine on them, onion bits and other topping materials, where all of these types of debris must be removed to prevent contamination of the next product placed on the pan; (b) to reduce the time required to clean the baking pans, for example to less than 2 seconds for each baking pan, thereby reducing the time needed to return them to service; and, (c) to improve the quality of the cleaning process so that fewer baking pans are diverted by quality control for not being adequately cleaned and less time is spent inspecting the baking pans to ensure that they are clean.

Baking pans are normally cleaned after each use. After being used to produce a baked product, sometimes there can be residual product stuck to the baking pan. In some processes the baked product receives toppings. By way of non-limiting examples, such toppings can include, glazes, powdered sugar, chocolate, seeds, nuts and egg wash. When toppings are applied during the production process, excess toppings fall onto the baking pan where the excess topping can adhere to the baking pan. If the toppings are applied before the product is baked, when the baking pan is heated during the baking process this results in the toppings being baked onto the baking pan. Even excess toppings applied after the baking process can be stuck to the baking pan aided by the residual heat retained in the baking pan. Some toppings are inherently sticky and will adhere to the baking pan with or without being subjected to elevated temperatures. Accordingly, it is important to clean the baking pans after each use to prevent the accumulation of debris that could affect product quality and the utility of the baking pan. A build-up of debris can burn and affect the quality of the baked goods. In addition, if the baking pans are used for more than one product, it is important that ingredients from one product do not contaminate another product, especially if ingredients, such as nuts or gluten could cause a consumer to have an allergic or other adverse reaction.

Baking pans can take various forms depending upon the product being produced. Some baking pans are flat, others have a raised lip or walls around the edges, other baking pans have recessed areas for receiving discrete dough or batter portions that are formed in the shape of the recessed area, and bread loaf and cake pans can have taller side walls than other pans. Consequently, the cleaning mechanism designed for a flat baking pan may not be ideal for cleaning a baking pan that has recessed areas, or taller side walls. A bakery that employs a variety of baking pan forms may have more than one pan cleaning machine, each one specialized for a different form of baking pan. Conventional pan cleaning machines use a rotating brush assembly to sweep over the baking pans to dislodge debris. Some pan cleaning machines use two rotating brush assemblies spinning in opposite directions but a rotating brush assembly is not the best cleaning mechanism for all types of baking pans, and may not do an adequate job on pans with raised perimeters or recessed pockets. Some machines orient the rotating brush assemblies on an angle so that the brush bristles at the end of each brush assembly will be angled into the corners of the pans, but this also has been found to do a poor job of cleaning some types of baking pans.

The orientation of the pans when they are being cleaned is also a factor in cleaning efficiency. Many pan cleaning machines clean the pans when they are horizontal with the baking side facing up. When being cleaned in this orientation, dislodged debris typically remains on the baking surface of the pan. To complete the cleaning process, the debris needs to removed and this is typically accomplished using compressed air. Often the compressing air blown onto the baking pan will blow a significant portion of the debris from the pan surface but because of the turbulence in the air, and the pockets and raised edges of some types of pans further disruption causes more turbulence causing debris to circulate back onto the surface of the pan. Some pan cleaning machines use several rows or spaced locations for blowing off the pan surface to attempt to remove all of the debris. More recently some pan cleaning machines, like the machine described in US Patent Application 2019/0090718 A1, published Mar. 28, 2019, teach a method of brushing the pans with the baking side facing up, and then inverting the pans and blowing compressed air onto the pans when they are in an inverted position, so that gravity urges debris to falls away from the pans as they are blown.

Accordingly, there is a need for an improved pan cleaning machine that is capable of cleaning a variety of different baking pan forms in a continuous operation at a high rate.

SUMMARY OF THE INVENTION

An improved pan cleaning machine has a cleaning section where the pans are tipped to a semi-inverted or fully inverted position where a plurality of different cleaning mechanisms are applied when the pans are in the semi-inverted or fully inverted position. In preferred arrangements the pans are oriented to be cleaned in a semi-inverted orientation with the baking surface facing down and between 90 and 30 degrees from horizonal, and more preferably between 60 and 45 degrees from horizontal so that gravitational forces do not cause all of the debris to fall directly back onto the cleaning mechanisms.

An improved pan cleaning machine uses carriages guided by tracks to carry pans in a continuous and fully automated flow through a cleaning section for higher throughput compared to batch cleaning systems. The carriages roll on tracks with the spacing between carriages automatically indexing the feed of pans carried on carriages in spaced relationship so that the edges of pans in consecutive carriages do not interfere with one another.

An improved pan cleaning machine has a cleaning section that comprises a plurality of frames for mounting a sequence of interchangeable modular cleaning mechanisms, with quick-release mounting arrangements so that cleaning mechanisms can be quickly changed for cleaning different types of pans or to replace brushes or other wearing parts of cleaning mechanisms when they require replacement. In some embodiments, the frames for mounting the cleaning mechanisms can comprise swing arms so that the cleaning mechanisms can be swung away from the cleaning position so that the cleaning mechanism can be removed and replaced without interrupting the operation of the machine. If the machine is stopped, the swing arm can still be used to facilitate access to the cleaning mechanism to reduce the time needed to complete the maintenance or replacement. Another advantage of mounting the cleaning mechanisms on swing arms is that this allows the position of the cleaning mechanism in relation to the baking pans to be adjustable during the cleaning process, for example, to increase the brushing force by moving the cleaning mechanism closer to the baking pans, or to prevent overloading the compressive force on the brush bristles by manipulating the position of the swing arm to move the cleaning mechanism further away from the baking pan. In addition, the swing arm makes the pan cleaning machine more adaptable for cleaning pans with different depths. For example, a cake pan can have a deeper depth than a flat baking pan, so the swing arm permits the cleaning mechanisms to be moved further away for deep pans and closer for flat baking sheets.

The plurality of frames can be used to provide redundancy for fast wearing or soiling brushes so that one cleaning mechanism can be on stand by and swung into operation when the other cleaning mechanism is swung away for cleaning or replacement. If debris that is transferred to brush bristles or other cleaning elements is allowed to build up, then sticky or oily debris can be transferred back to the pans, and this can be a problem if the debris includes ingredients that could be allergens. By way of example, some cleaning mechanisms can require cleaning or replacement after 2 hours of operation so an advantage of the disclosed pan cleaning machine is that it allows continuous operation when there is a cleaning mechanism on standby, and the soiled cleaning mechanism can be cleaned or replaced without stopping the pan cleaning machine. Duplication of cleaning mechanisms can also be advantageous when some products contain nuts or other allergens that cannot be transferred to other products that are nut free; in this case, to reduce the chance of cross-contamination, one set of cleaning mechanisms can be used for nut-free products and another set of cleaning mechanisms can be used for products containing nuts. To reduce the chance of the wrong brushes being used for the wrong pans, the selection of brushes could be programmed into the machine control system so that brushes are switched automatically without any danger of human error.

Because conventional rotating brushes are not effective for all pan types, an improved pan cleaning machine with a plurality of different cleaning mechanisms with one cleaning mechanism comprising a brush plate unit that comprises a field of bristles attached to a brush base that moves in a plane parallel to the baking surface plane of the baking pans, with a predetermined motion that can be orbital, reciprocating, vibrating, or a combination of different motions. The speed and amplitude of the motions can be controlled by a computer program associated with the machine control system. Different actuation assemblies can be required for different motions in the horizontal plane, so some pan cleaning machines can have separate brush plate units mounted to respective swing arm assemblies so that a machine control system can select the brush plate unit with the desired bristle arrangement and motion for the baking pans that are being cleaned. When the pan cleaning machine is intended to be used to clean pans with multiple levels, for example, pans with raised lips and pocket recesses, such as cupcake pans and muffin pans, the brush plate unit can be equipped with bristles of different lengths so that all surfaces of the baking pans are adequately cleaned. For cleaning mechanisms that include a rotating brush the brush shaft can be mounted without a threaded coupling by using a retractable idler coupling arrangement, rotating brushes can be removed and replaced in much less time than conventional rotating brushes. Flat brush plate units can also be coupled with quick-release coupling arrangements to make removal and replacement of brush plate units quick and easy.

While the disclosed pan cleaning machine has been described in relation to a machine for cleaning baking pans in a bakery for mass production of baked goods, there are other industrial applications that use pans, molds, trays, containers or other receptacles that could also use the disclosed pan cleaning machine. Accordingly, in this disclosure, references to "pans", or "baking pans" is defined to be any kind of pan, tray, mold, container, or other receptacle that is used as part of a high-volume manufacturing process and that requires cleaning either periodically or after every use. An advantage of a modular design for the disclosed machine is that it facilitates manufacturing because the same components can be made for pan cleaning machines that can be applied also to different applications, simply by selecting the types of cleaning mechanism to bolt or weld onto the support frame. An improved pan cleaning machine has an infeed section, a cleaning section, and a discharge section. The main variable is the length of the cleaning section and how many cleaning mechanisms are mounted in the cleaning section. The support structure comprising a swing arm can be made the similar if not the same for all types of cleaning mechanisms, reducing the cost of manufacturing and making machines easier to maintain with common parts for familiarity of maintenance.

The disclosed machine can further comprise a plurality of sensors that collect information that a machine control system can use to automate the operation of the machine. For example, there can be sensors that can detect if a pan has not been properly cleaned and when this is detected the machine control system can operate a diversion conveyor to remove the detected pan from the system, preventing it from being returned to service until it is properly cleaned. In other embodiments the sensors can detect the type of pan that is being cleaned. For example, some operations have designated pans that are never used for nuts or seeds, and when these pans are detected the machine control system can be programmed to operate the diversion conveyor to direct these pans to a take-away conveyor for nut-free or seed-free products that is different from the take-away conveyor that is used for general purpose pans. Alternatively, the bakery can run pans exposed to seeds or nuts all together in a batch to keep them separated from pans used for other products. The machine can also comprise sensors for detecting the type of pan that is being cleaned and the type of debris that is on the pan. If the pan is a flat baking sheet that does not have anything that is strongly adhered to it, the machine control system can activate only one cleaning mechanism, such as a rotating brush assembly, and automatically take other cleaning mechanisms out of service by activating actuators on respective swing arm support frames to pivot unnecessary cleaning mechanisms away from the cleaning line. There can be different cleaning requirements for different pans, so the advantage of this capability is that the cleaning mechanisms not required for some pans can be removed from service, saving brushes and other wearing components from unnecessary wear, and reducing power consumption. The machine can also comprise sensors for detecting the height of the pans in the cleaning section. Since some pans are flat and some pans can have raised perimeters and/or recessed molds, not all pans have the same depth. In addition, there can be variations in depth because some pans can become warped or bent. By detecting the height of the pans, the machine control system can adjust the distance of the cleaning mechanisms from the pans so that the desired spacing is achieved between the pan and the cleaning mechanism to avoid jamming the machine or applying too much or too little pressure on the brush bristles for cleaning. Sensors can also detect the style of pan so that the machine control system can enable pre-programmed cleaning routines. For example, if the pan has recessed pockets, a brush plate unit can be controlled to have orbital movements instead of reciprocating back and forth in a linear fashion. Many types of sensors are known and the type of sensor chosen can be influenced by the application. For example, in a bakery application, where there can be a lot of dust or debris in the cleaning section, instead of an optical sensor, other types of sensors, such as magnetic or mechanical or strain-type sensors can be selected for measuring variables such as pan height, pressure on the cleaning mechanism, or weight. Alternatively, the pans can be coded and the pan cleaning machine can be equipped with a code reader to determine what type of pan is being cleaned so that an appropriate pre-programmed cleaning routine can be selected that controls which cleaning mechanisms are activated, the distance between the cleaning mechanisms and the pans, and the settings for the cleaning mechanism, such as the pattern of motion and speed of motion for brushes and where the compressed air is focused and how powerful the blowing action for air knives.

A method of cleaning pans uses the disclosed pan cleaning machine to run a continuous and automated pan cleaning process, comprising feeding dirty pans onto a carriage-on-track conveyor system. Carrying pans on a carriage and moving the carriage along a track through a cleaning section where the pan is tipped to a position where the process side of the pan faces downwards, towards a cleaning mechanism that cleans the pan from below, allowing gravity to assist with the removal of debris from the pan. The method further comprises moving the carriage along the track from the cleaning section to a discharge section where the pan is deposited on a take-away conveyor. In the disclosed method in the cleaning section the pan is tipped to a cleaning position where the process side of the pan is oriented between 90 and 0 degrees from horizontal (where at 0 degrees the pan is "fully inverted"), and more preferably between 60 and 45 degrees from the horizontal plane, so that the pan is tipped at an angle and "semi-inverted".

The method can further comprise using sensors to detect parameters that allow the cleaning process to be customized and automated for cleaning different types of pans. For example, by detecting the type of pan being cleaned, the method can comprise automatically selecting a predetermined cleaning routine that determines the cleaning mechanisms to be deployed, taking unnecessary cleaning mechanisms out of service, and adjusting the speed and movements of the cleaning mechanism, and adjusting the spacing between the cleaning mechanism and the pans being cleaned. In addition to preset cleaning routines, the machine control system can receive real-time data to detect when to make adjustments to the preset routine, for example, by detecting a warped pan, the machine control system can automatically adjust the position of the cleaning mechanism to allow more space between the cleaning mechanism and the warped pan, and then return the cleaning mechanisms to the preset position after the warped pan is cleaned. A pan cleaning machine can use different types of sensors for detecting a warped pan, for example sensors that measure of the depth of a pan will also detect an increased depth when a pan is warped, or sensors that detect the loading pressure on the cleaning mechanism will report a higher loading pressure when a warped pan is being cleaned, until the machine control system detects the greater depth or elevated loading pressure and backs the cleaning mechanism away from the pan as appropriate to prevent jamming and to prevent elevated loading pressures that could damage a cleaning mechanism, for example, by bending brush bristles beyond their elastic limit. Sensors can also be used to determine when two much pressure is being applied to a pan in the cleaning section so that the machine control system can automatically adjust the cleaning mechanism to back off from the pans, or conversely, if too little pressure is detected, then the machine control system can command the cleaning mechanism to move closer. Reduced pressure can occur with some cleaning mechanism if the brush bristles become shorter as they wear. For applications that use different types of pans, the machine control system can determine the type of pan being cleaned from sensor or operator input and at the discharge section, a diversion conveyor can be positioned to divert pans to the correct take-away conveyor to return the pan to service, or to remove the pan from service if sensors or operators detect that the was not cleaned well or if the pan is too badly warped or damaged.

The method can further comprise steps for maintaining and servicing the pan cleaning machine with reduced downtime or without stopping the machine. Preferred embodiments of the disclosed pan cleaning machine mount the cleaning mechanisms on frames that have swing arms so that the cleaning mechanism can be swung away from the cleaning line to a position where it is safe to service the cleaning mechanism, including cleaning, removing worn parts, like brushes, and installing replacement parts. By swinging the cleaning mechanism away from the cleaning line, the pan cleaning machine can continue to run using other cleaning machines in the cleaning section, while servicing the cleaning mechanism that has been taken out of service. The person servicing a cleaning mechanism disconnects the cleaning mechanism from automated control so that the machine control system cannot deploy a cleaning mechanism while it is being serviced.

BRIEF DESCRIPTION OF THE DRAWINGS

FIGS. 5b and 5c show a view with part of the brush shaft cut away to show how the rotating brush is supported and coupled to the frame. FIG. 5d shows the coupling in an open position for releasing a worn rotating brush so that it can be replaced with a new rotating brush.

FIGS. 7c and 7d shows schematic views of the brush plate unit of FIG. 7a applied to a flat baking pan.

FIG. 7e-7f depict side views of an alternative brush plate unit with bristles that extend at an inclined angle from a base that can be mounted to a cleaning mechanism of a pan cleaning machine.

FIG. 8a shows the brush plate unit in association with a brush drive assembly. FIG. 8b shows a detailed view of an arrangement for attaching the brush plate unit to the brush drive assembly. FIG. 8c is an exploded view that shows the brush plate unit spaced apart from the brush frame and the brush drive assembly.

FIGS. 9a through 9d show views of a cleaning mechanism that comprises an air knife, meaning an apparatus for directing compressed air onto the baking pan. FIG. 9a is an isometric view showing the air knife supported on a frame attached to the pan cleaning machine. FIG. 9b shows an end view of the air knife. FIG. 9c is an exploded view of the air knife. FIG. 9d is an isometric view of an air knife.

FIG. 10a is a perspective view that shows two pans on carriages and a third pan deposited on a take-away conveyor. FIGS. 10b and 10 are side views that show an optional pivoting feature that enables pans to be diverted to selectively direct pans to one of two destinations.

DETAILED DESCRIPTION OF ILLUSTRATIVE EMBODIMENT(S)

The following detailed description represents embodiments that are intended to provide an overview or framework for understanding the nature and character of the disclosed pan cleaning machine and method. The accompanying drawings are included to provide further understanding of the disclosed apparatus and method and constitute part of the specification. Accordingly, the detailed descriptions and drawings are non-limiting to the scope of the concepts that are disclosed and are intended to illustrate and explain the principles and operations of the apparatus and method, as exemplified by these embodiments.

Figure 1:
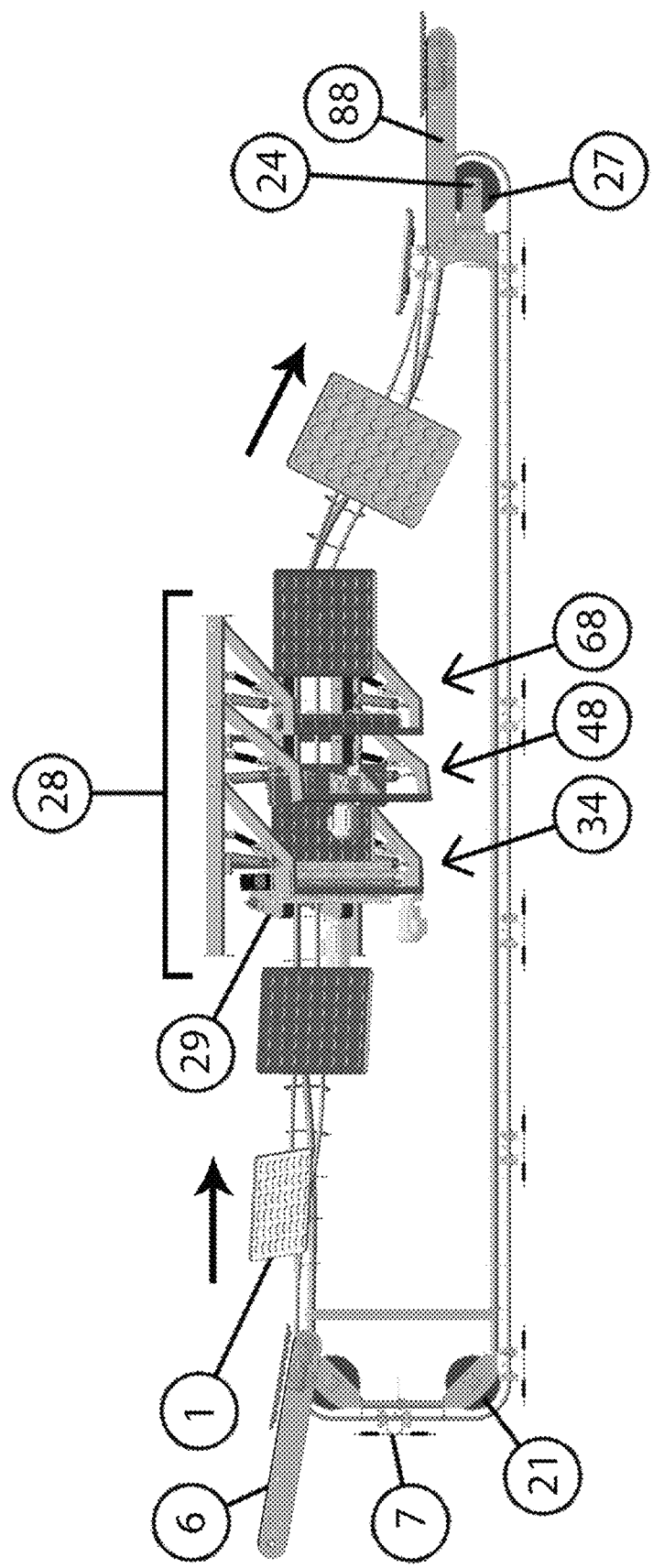
FIG. 1 is a side view of a pan cleaning machine with a plurality of rolling carriages on a track.

Referring to FIG. 1, a side view of a pan cleaning machine is shown. In the illustrated example, the pan cleaning machine is used to clean baking pans, such as those used in commercial mass production bakeries. This example is used in this disclosure to illustrate the claimed concepts, but it will be understood that the disclosed machine and method can be applied to other mass production processes that employ pans that require cleaning. In a bakery application, the baking pans are ordinarily made from a ferrous metal, so in the illustrated embodiment, magnets are used to hold the baking pans on the conveyors and the carriages of the pan cleaning machine. Without departing from the novel and inventive concepts of the disclosed pan cleaning machine and associated method, other attachment mechanisms can be substituted, for example clamps or pins, if the pans are made from a non-ferrous material.

Figure 2:
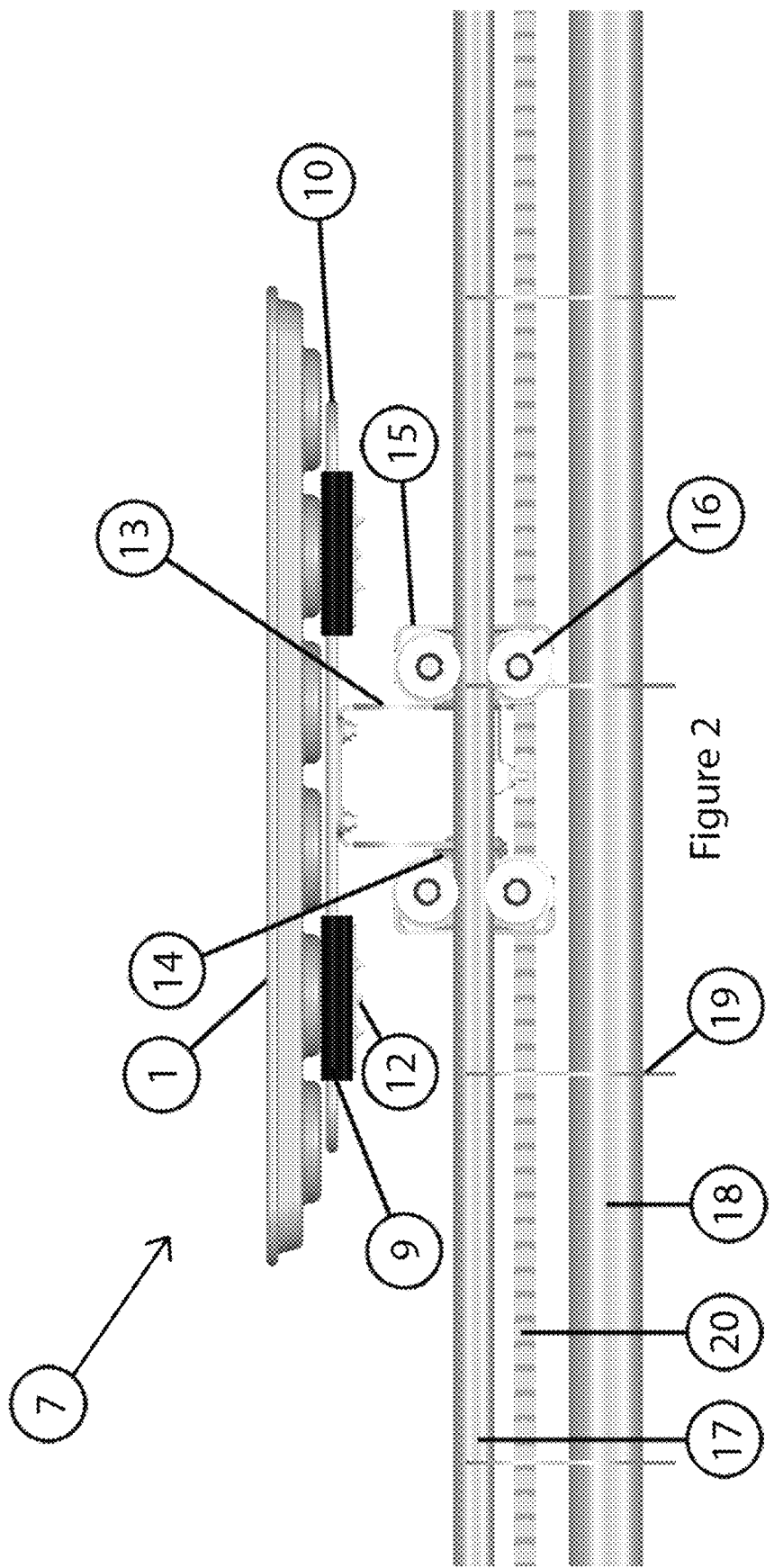
FIG. 2 is a side view of a rolling carriage on a track for carrying a baking pan through the pan cleaning machine of FIG. 1.

In the side view of FIG. 1, dirty baking pans 1 enter from the left, are cleaned by the pan cleaning machine and exit at the right. Dirty pans are fed to the machine by infeed conveyor 6. The pan cleaning machine comprises a plurality of carriages 7 that are guided through the pan cleaning machine by tracks 17 as shown and described in more detail beginning with the description of the close-up view in FIG. 2. An overview of the pan cleaning machine and associated method is provided with reference to FIG. 1. The spacing of carriages 7 along tracks 17 is greater than the length of the baking pans, causing an indexing of the pans passing through the pan cleaning machine, meaning that there is a predetermined gap between each baking pan as it is carried through the pan cleaning machine. Previously known pan cleaning machines follow either a linear or two-dimensional path as they are cleaned. As described above, more recently pan cleaning machines have added inversion during the pan cleaning step but even with these more recent developments, the path followed by the baking pans is mostly in a simple motion with rotation of the baking pans around a fixed axis that is either perpendicular or parallel to the direction of movement. With such simple motions, contact between the edges of two adjacent baking pans does not interfere with the motion of either baking pan. With the presently disclosed pan cleaning machine, the carriage on track design allows more complex movements, where the path followed by the baking pans through the pan cleaning machine can change in three dimensions and the baking pans can twist about the axis of forward motion, for example, in a tipping or helical motion, so the indexing and spacing between the baking pans prevents the forward edge of a baking pans from interfering with rearward edge of the baking pan that it is following. In the embodiment shown in FIG. 1, baking pans 1 held by magnets to carriages 7 and are tipped by being rotated about 135 degrees so that the working surface of the baking pans, which requires cleaning is tipped to face downwards so that gravitational forces can help debris that is cleaned from the pan to fall away. In cleaning section 28, the illustrated embodiment shows three cleaning mechanisms or modular pan cleaning assemblies that can be applied to clean baking pans 1 as they are guided through cleaning section 28. For example, first cleaning mechanism or modular pan cleaning assembly 34 can apply a rotating brush to sweep away large debris such as any adhering baking product, product residue or excess toppings loosely stuck to the baking pans. Second cleaning mechanism or modular pan cleaning assembly 48 can employ a substantially flat brush that moves in an orbital, vibrating, or oscillating movement to scrub the baking pans to remove debris that is more fixedly stuck to the baking pans. A flat brush moving in a plane parallel to the surface of the baking pan can be better than a rotating brush at cleaning corners for baking pans that have raised perimeter edges or recessed pockets. Third cleaning mechanism or modular pan cleaning assembly 68 can be an air knife, which directs compressed air onto the baking pans to further clean and blow off debris from the baking pans. Compared to previous pan cleaning machines that mainly use a rotating brush to sweep debris from the baking pans, by employing a plurality of different cleaning mechanisms that can apply different brushing actions, better cleaning is enabled and the disclosed pan cleaning machine is an improvement over previously known pan cleaning machines because the plurality of different cleaning mechanisms makes the disclosed pan cleaning machine more versatile for cleaning different types of pans. By making a longer cleaning section, a pan cleaning machine can be made with more cleaning mechanisms, so the illustrated embodiment in FIG. 3 which has three cleaning mechanisms is only illustrative of the general arrangement. Some pan cleaning machines made with the disclosed concepts can employ more cleaning mechanism to apply different cleaning mechanisms for better cleaning. A plurality of cleaning mechanisms of the same type but oriented at a different angle to the pans can be employed to clean better in corners. A pan cleaning machine with a plurality of cleaning mechanisms can move individual cleaning mechanisms towards and away from the pans so that an individual cleaning mechanism can be moved away from the pans, shut down and serviced, while the pan cleaning machines remains in operation. For a continuous operation, cleaning mechanisms that require regular servicing or replacement of brushes can be provided with redundancy so the pan cleaning machine can continue to operate, as normal, while one cleaning mechanism is out of service. From historical data, a bakery might know how many pans a brush can clean before it needs to be replaced or removed for cleaning. For example, if brushes are used to brush away semi-burnt pieces of onion garnish, that were intended for the top of a bun but that rolled onto the pan, the onion can become a sticky, gummy substance that builds up on the brush and clogs up the brush bristles. Once the brush bristles are clogged with such a substance, then further operation of the brush just transfers the sticky substance from one pan to another. In such cases, the machine control system can be programmed to count the number of pans cleaned, and to swing the brush away and out of service after counting 20,000 pans (or whatever number of pans is determined from examining the historical data), while at the same time deploying another cleaning mechanism that was on stand by and ready to be put into service, allowing the clogged brush to be removed and replaced or cleaned.

Different types of debris or different types of pans can require different cleaning mechanisms and if a bakery uses a plurality of pan types and the same pan cleaning machine is used to clean a plurality of pan types, then a cleaning section with a plurality of cleaning mechanisms that can each be independently and selectively deployed, can be advantageous to reduce wear on cleaning mechanisms that are not needed by deploying only the cleaning mechanisms that are needed for the type of pans being cleaned.

After pans 1 are cleaned in the cleaning section 28, carriages 7 carry cleaned pans to a take-way conveyor. In the illustrated embodiment, pans 1 are first deposited on diversion conveyor 88, which is described in more detail with respect to FIGS. 10a through 10c. As shown in FIG. 1, tracks 17 can be oriented to flip pans back to their original orientation, with the process side of the pan facing up. In alternative embodiments, if the bakery is set up to store baking pans in an inverted orientation until they are used again, tracks 17 can be oriented to complete the rotation of the pans to a fully inverted position before depositing the cleaned pans onto diversion conveyor 88.

The drive system for the carriages is not readily seen in the scale of FIG. 1, but as will be shown in other Figures, the drive system can comprise a motion transmission element that is connected to each carriage. Drive sprocket 21 can impart motion to the motion transmission element, which can be a cable, a chain, a belt, or other type of motion transmission element. For example, a side bending chain has been found to be a suitable motion transmission element because it can bend sideways, twist in a helical fashion, and bend like a conventional chain so it can be guided by conventional chain idling sprockets 27 and pulled by drive sprocket 21. Accordingly, a side bending chain has the flexibility to follow the twisting path of the tracks and when held in tension it can pull the carriages along the tracks. A prime mover device, such as an electric motor coupled through a gear reduction unit in a self-contained motor gear unit provides rotational energy to drive shaft 24 of drive sprocket 21.

As shown in FIG. 2 and FIGS. 3a through 3c, carriage 7 comprises support grid 10 which is a substantially flat structure for receiving pan 1. Support grid 10 is connected to a bogie wheel assembly by bogie frame 13, and bogie wheels 16 are in a rolling relationship with tracks 17. In this illustrated embodiment, carriage 7 travels on two parallel tracks 17, but in the side view of FIG. 2, only one track can be seen. This carriage and track arrangement is similar to arrangements used by some roller coasters, but an arrangement like this is novel for pan cleaning machines. Four bogie wheels 16 are employed to hold carriage 7 to each track 17. Each bogie wheel is attached to a pivot wheel plate 16, which is in turn connected to twist plate 14, which is attached to bogie frame 13. Each carriage 7 has one pivot wheel plate 16 for each pair of bogie wheels 16. Pivot wheel plate 16 holds each pair of bogie wheels 16 at a spacing that holds the attached bogie wheels in contact with opposite sides of track 17. Pivot wheel plate 16 is attached to twist plate 14 by a fastener that allows pivot wheel plate 16 to pivot to follow track 16 when the path of the track twists up or down. The fastener between twist plate 14 and bogie frame 13 allows twist plate 14 to rotate around the axis of the fastener when track 17 turns sideways to the left or right. That is, the axis of rotation for the twist plate is perpendicular to the axis of pivoting for pivot wheel place 16, and motion allowed by pivot wheel plates 16 and twist plates 14 enable carriage 7 to be pulled along a complex path that can change the orientation of the pans for improved cleaning performance.

The rotational axis of twist plate 14, which is where twist plate 14 is connected to bogie frame 13 is centered between tracks 17 and bogie frame 14 extends from this point to support grid 10, which forms a structure for supporting pans when carried by carrier 7. To protect the pans from metal-to-metal contact, and to provide a friction gripping surface, carrier 7 can be equipped with gription pads 9 fastened to support grid 10 by clamp plates 11 and fasteners 12.

Figure 3A:
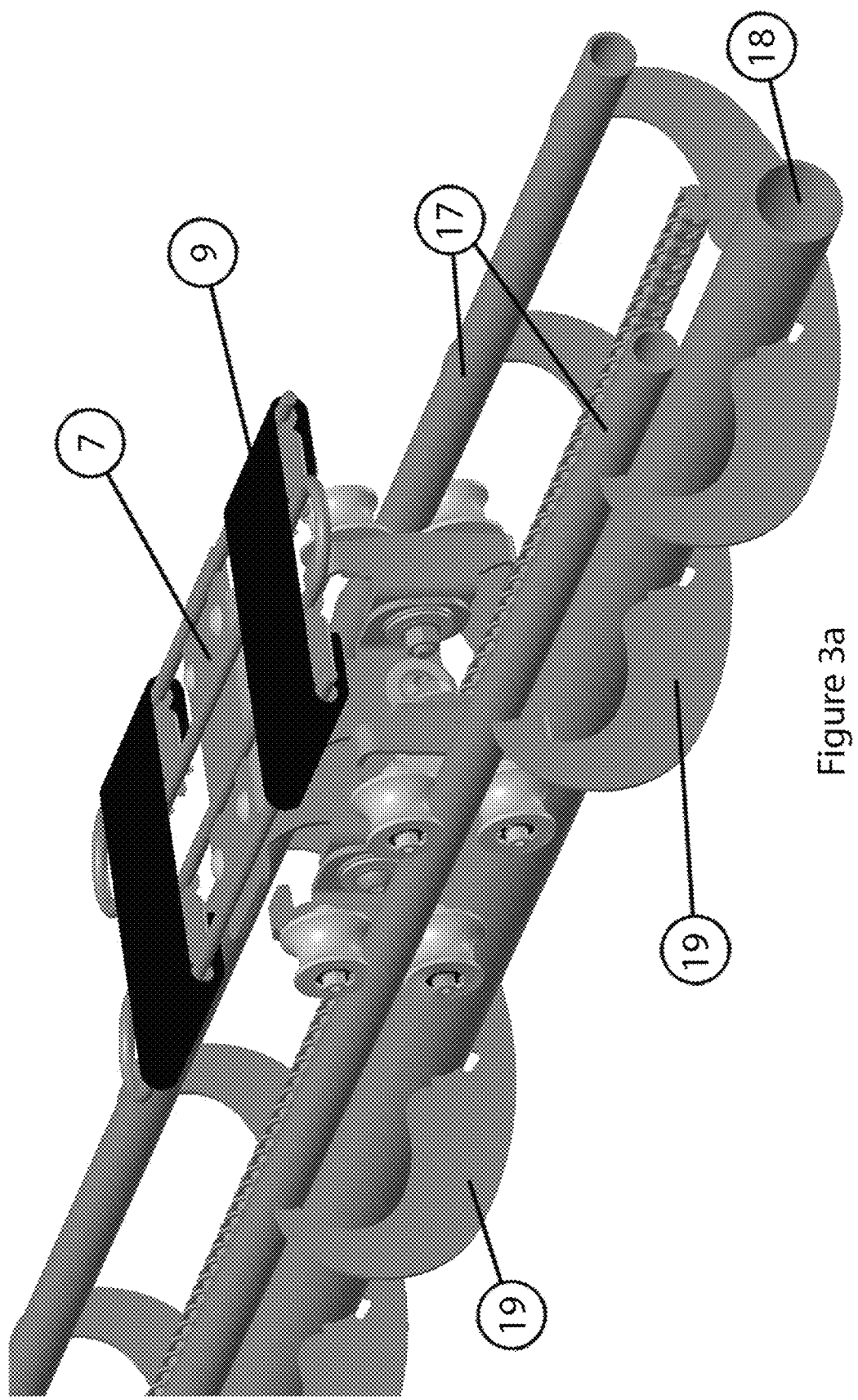
FIGS. 3a through 3c are isometric views of a rolling carriage assembly, with FIG. 3a showing the carriage assembly on a track, and FIGS. 3b and 3c showing two views of the carriage assembly with the track removed to better illustrate the carriage assembly.

As better shown in FIG. 3a, tracks 17 are structurally supported by frame 18, which is connected to tracks 17 by ribs 19, to form a rigid structure that supports and guides a plurality of carriages. It will be understood that the shown track structure is merely illustrative and that other structural designs are possible within the spirit of the disclosed concepts. For example, tracks can be designed to have the requisite strength and rigidity on their own, making a frame member unnecessary. In the case of a single track, there can be no need for any ribs, but in the case of a multi-track arrangement there can still be ribs between the tracks, even if there is no frame member.

Figure 3B:
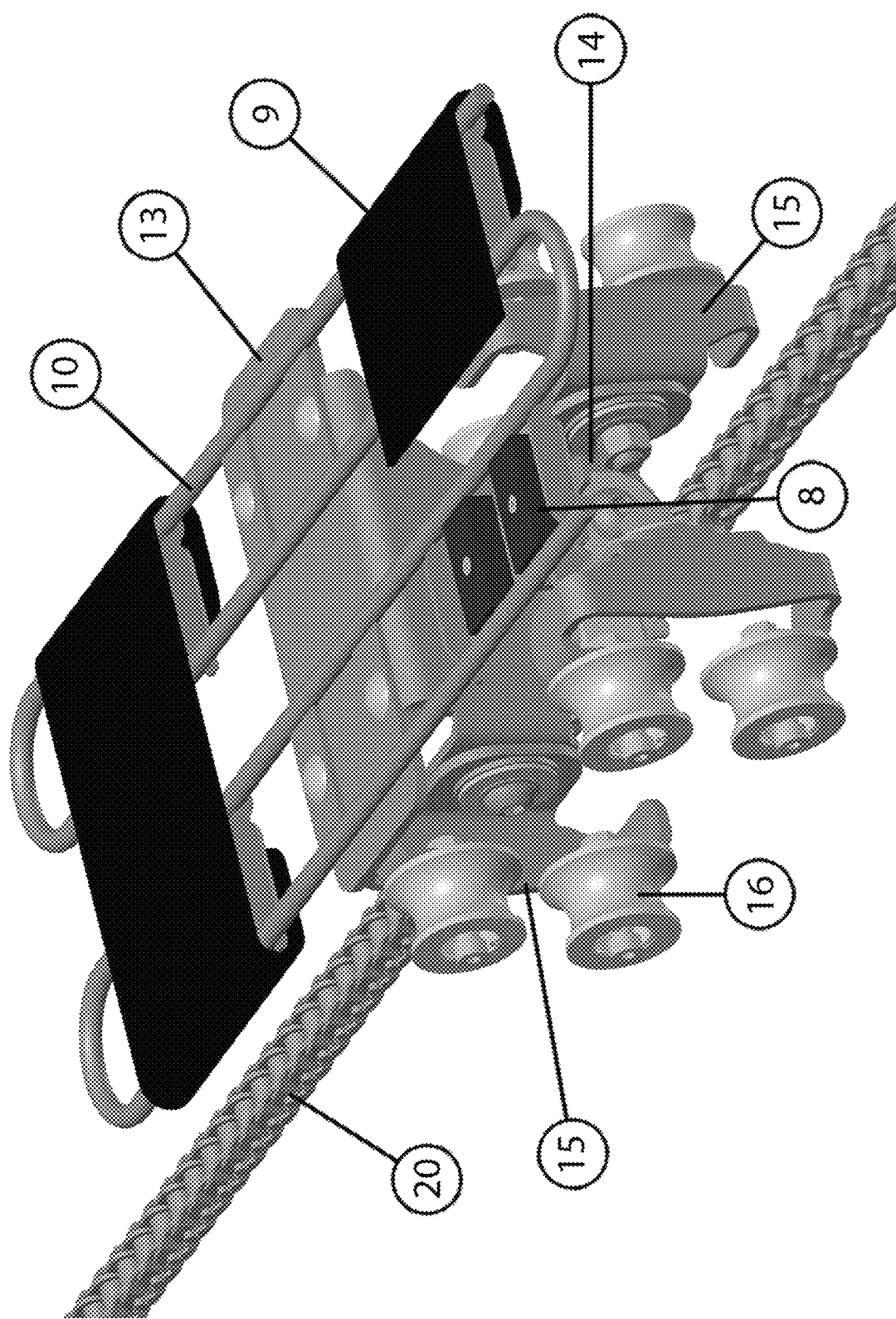

As shown in FIG. 3b, for pan cleaning machines used to clean ferrous metal pans, part of gription pad 9 is cut away to show magnets 8 positioned where a magnetic force can be exerted to hold pan 1 onto carriage 7 as it twists, flips and/or inverts the pans. Since some baking pans can become warped from heating, gription pad 9 can be made from a flexible material to allow contact with pans that are not flat or that are normally flat and have become warped or bent, and to better grip such pans, magnets 8 can be attached to support grid 10 in a manner that allows sliding movements perpendicular to the flat plane defined by support grid 10. For example, with a warped baking pan, magnet 8 can be installed in a floating arrangement that enables them to slide to a position above the flat plane of support grid 10 to be closer to the pan and gription pad 9 will be pressed between the pan and floating magnet 8. The amount of float is limited because if pans are too badly warped or bent, they are removed from service because they could become jammed in the pan cleaning machine or other machines in the production process.

Figure 3C:
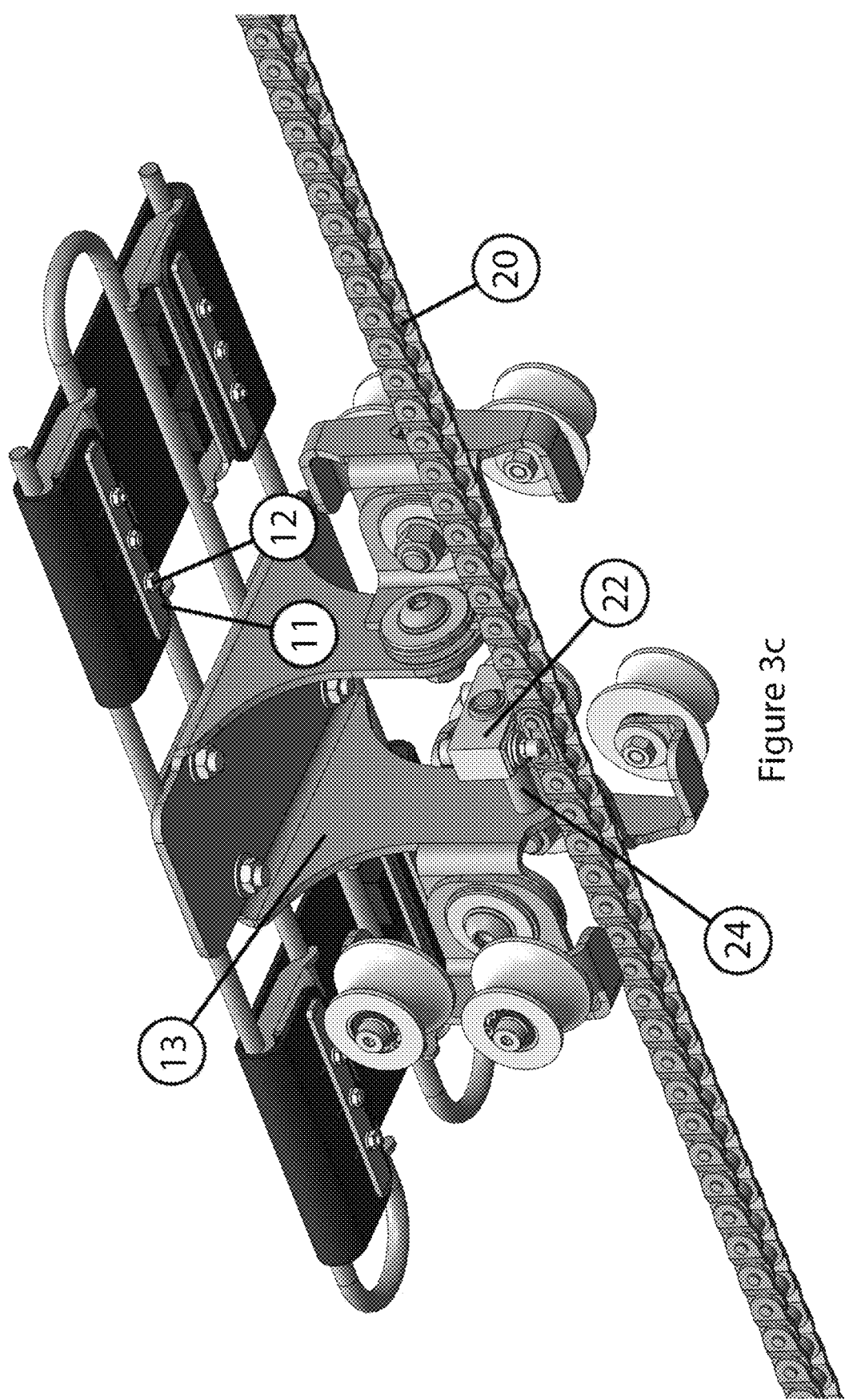

In FIGS. 3b and 3c tracks 17 are removed to better show the structure of the bogie wheel assembly. As shown in FIG. 3c, motion transmission element 20 is attached to bogie frame 13 by an arrangement that allows freedom of movement so that the twisting and turning of carriage 7 as it rolls along tracks 17, does not unduly twist motion transmission element 20. In the illustrated embodiment, this is achieved by connecting pulling lug 24 to motion transmission element 20 through pulling lug swivel 23.

Figure 4:
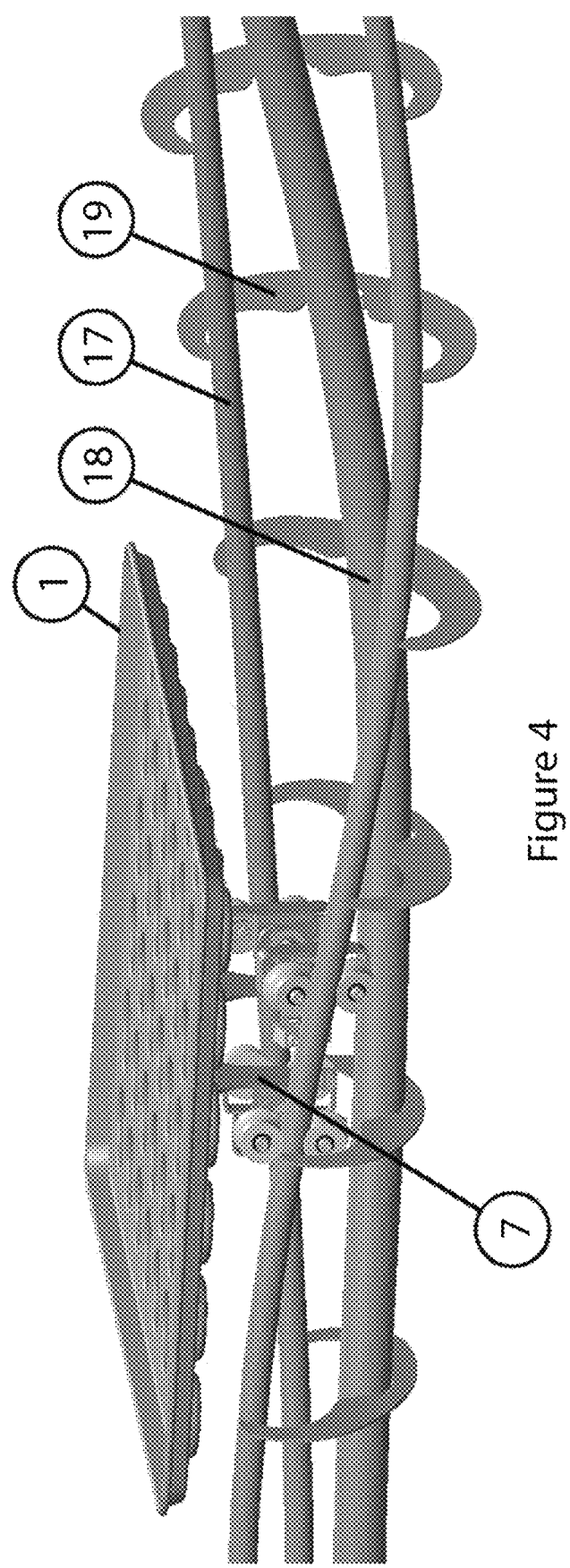
FIG. 4 is a perspective view of a rolling carriage carrying a pan as it approaches a place where the track will change the orientation of the rolling carriage and the pan.

The perspective view of FIG. 4 shows how that path for carriage 7 can dip and twist as it follows the path determined by tracks 17. In FIG. 4, carriage 7 is approaching a section of the track where top surface of pan 1 will be tipped and rotated 135 degrees. Accordingly, the near side bogie wheels will dip down and the far side bogie wheels will rise up and carriage 7 will twist as pan is flipped over.

FIGS. 5a through 5d and FIG. 6a show isometric views of first cleaning mechanism or modular pan cleaning assembly 34 shown in FIG. 1. First cleaning mechanism 34 is an example of a cleaning mechanism that comprises rotating brush 35 that has bristles that sweep the baking surface of baking pans 1. Rotating brush 35 is driven by drive motor 39. If the pan cleaning machine is equipped with only one rotating brush, it preferably rotates in a direction opposite to the direction that the pan is traveling so that the relative velocity of the bristles against the pan is higher. However, if a pan cleaning machine is equipped with two rotating brushes, then the two rotating brushes can rotate in opposite directions. While the illustrated embodiment shows this type of cleaning mechanism in the first position, a feature of the disclosed pan cleaning machine is that the cleaning mechanisms can be made to be modular so that the support structure used for each cleaning mechanism has as structure that can be utilized to support different cleaning mechanisms. That is, for bakeries that use different types of pans, the same cleaning machine can be configured with different interchangeable cleaning mechanisms so that the cleaning mechanisms can be changed when the style of pans is switched from one style to another. Alternatively, as described above, cleaning section 28 can have a plurality of cleaning mechanism or modular pan cleaning assemblies that are selectively deployed depending upon the style of pan being cleaned. Accordingly, while FIG. 1 shows a rotating brush as shown in FIGS. 5a through 5d as first cleaning mechanism 34, it will be understood that the pan cleaning machine can also be configured with a different type of cleaning mechanism in the first position. A rotating brush such as the one shown in FIG. 5a has large spaces between each row of bristles and that helps to make this type of brush effective for sweeping away large debris that has adhered to the pan, such as excess toppings and pieces of baked product that has stuck to the baking pan. However, this type of cleaning mechanism is not as effective for cleaning pans that have lots of recesses and corners.

In the embodiment depicted in FIG. 1, pans 1 are fed into the pan cleaning machine with the baking side facing upwards and are tipped by 135 degrees so that the baking side is facing downwards at a 45-degree angle from horizontal. Within the spirit of this concept, a pan cleaning machine can be made to tip the pans to a different angle from horizontal or inverted completely, 180 degrees so that the pan is flat with the baking surface facing down. The angle to which pans are flipped is determined by the path of the track. An advantage of a design that flips the pans less than 180 degrees is that gravitational forces that help to remove debris from the pan will not cause the debris to fall directly onto the cleaning mechanism. The design of the pan cleaning machine can choose an angle of orientation that also takes into account the forces acting on the debris from the rotating brush to further direct the removed debris to a collection bin.

Figure 6A:
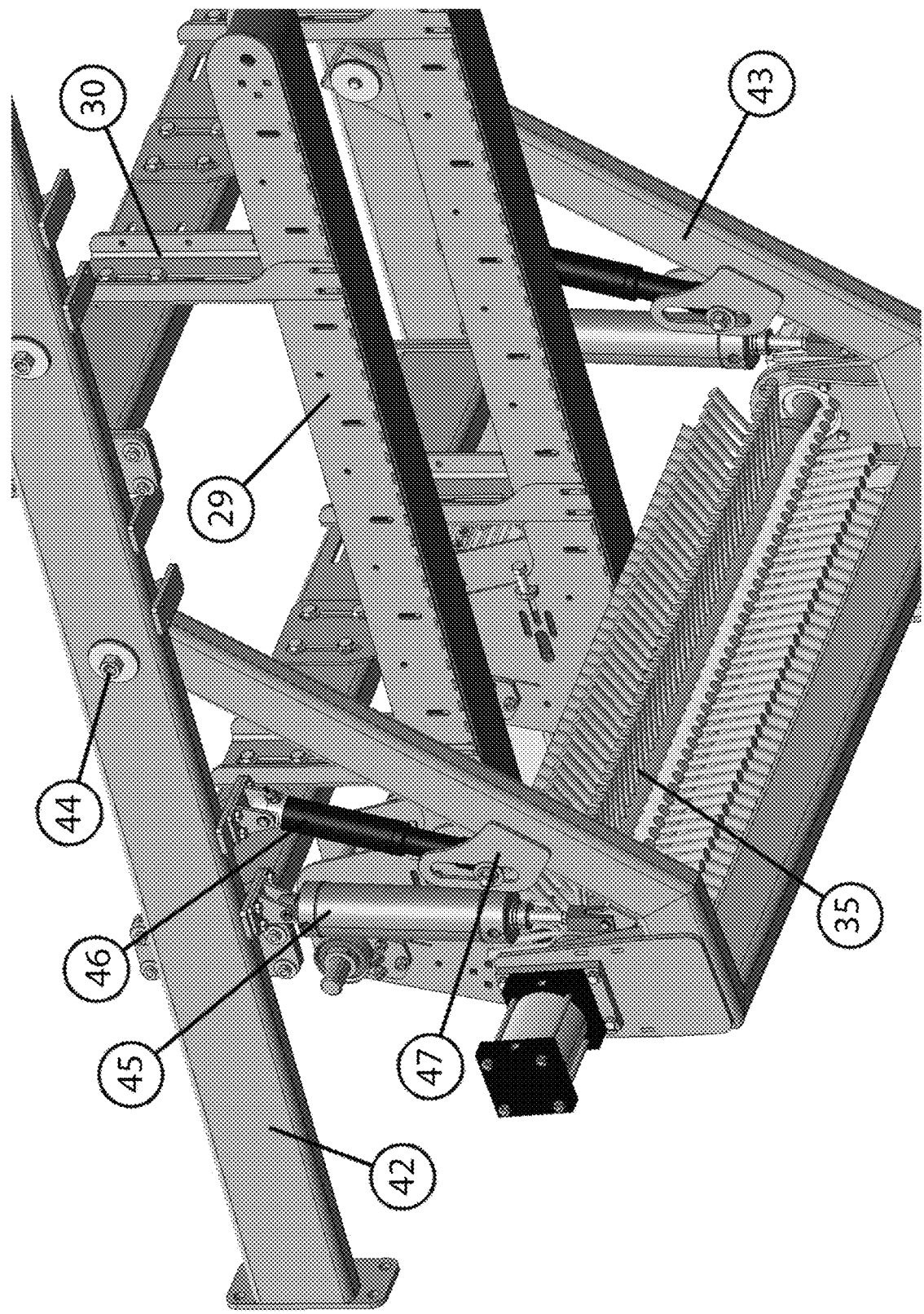
FIG. 6a is an isometric view and FIG. 6b is a side view that show how the rotating brush frame of FIG. 5a can be attached to the pan cleaning machine to clean inverted pans.

As shown in FIG. 6a, first cleaning mechanism 34 is attached to machine frame 42 by swing arm 43. Swing arm 43 can pivot on swing arm pivot 44 to move the cleaning mechanism towards or away from pans moving through the pan cleaning machine. The support structure is designed so that the axis of rotating brush 35 is parallel to the surface of pan 1 in its flipped orientation, so that the bristles are all brought into contact with baking surface of each pan 1 when it passes above. The movement of swing arm 43 can be controlled by actuator 45, which can be a pneumatic cylinder, as shown, or any other type of actuator that provides reciprocating motion, for example, mechanical screw actuators or hydraulic actuators. For bakery applications, if a seal breaks, a benefit of pneumatic cylinder actuators is that it will mainly release air so the surrounding area will not be contaminated. However, with pneumatic cylinders it can be difficult to control the movement of swing arm 43 to intermediate positions, so stroke limit controller 46, is connected to machine frame 42 and to swing arm 43 through a pin traveling in a slot in guide plate 47, and stroke limit controller 46 is operable to limit the movement of swing arm by stopping the movement of swing arm 43 when the pin reaches the end of the slot in guide plate 47. Stroke limit controller 46 can be a linear indexing cylinder that can retract and extend to preset or adjustable values under electric control. For example, when cleaning flat baking pans stroke limit controller 46 is set in a position to allow the greatest movement towards carriages 7 and pans 1, and when deeper baking pans are being cleaned stroke limit controller 46 is set in a position that keeps rotating brush 35 further from the pans so that the pans can pass through the cleaning section without being jammed between carriers 7 and rotating brush 35, and without bending brush bristles beyond their elastic limits. The slot in guide plate 47 allows actuator 45 to move rotating brush towards and away from pans 1 to engage or disengage as described above, but when the pin in the slot of guide plate 47 reaches the end of the slot, movement is stopped. As shown, for example, in FIG. 6a the support structure for the cleaning mechanisms have a swing arm on each side and each swing arm has respective actuator 45, stroke limit controller 46 and guide plate 47. In some embodiments the swing arm assembly can be designed with some "play" so that the swing arm is not held rigidly to the preset position. For example, springs or a pressure release valve from the actuator can be used to allow some movement from the preset position when a warped, bent or otherwise taller pan is fed to a cleaning mechanism. Once the taller pan has passed through the cleaning mechanism it can be automatically restored to its preset position.

Figure 5A:
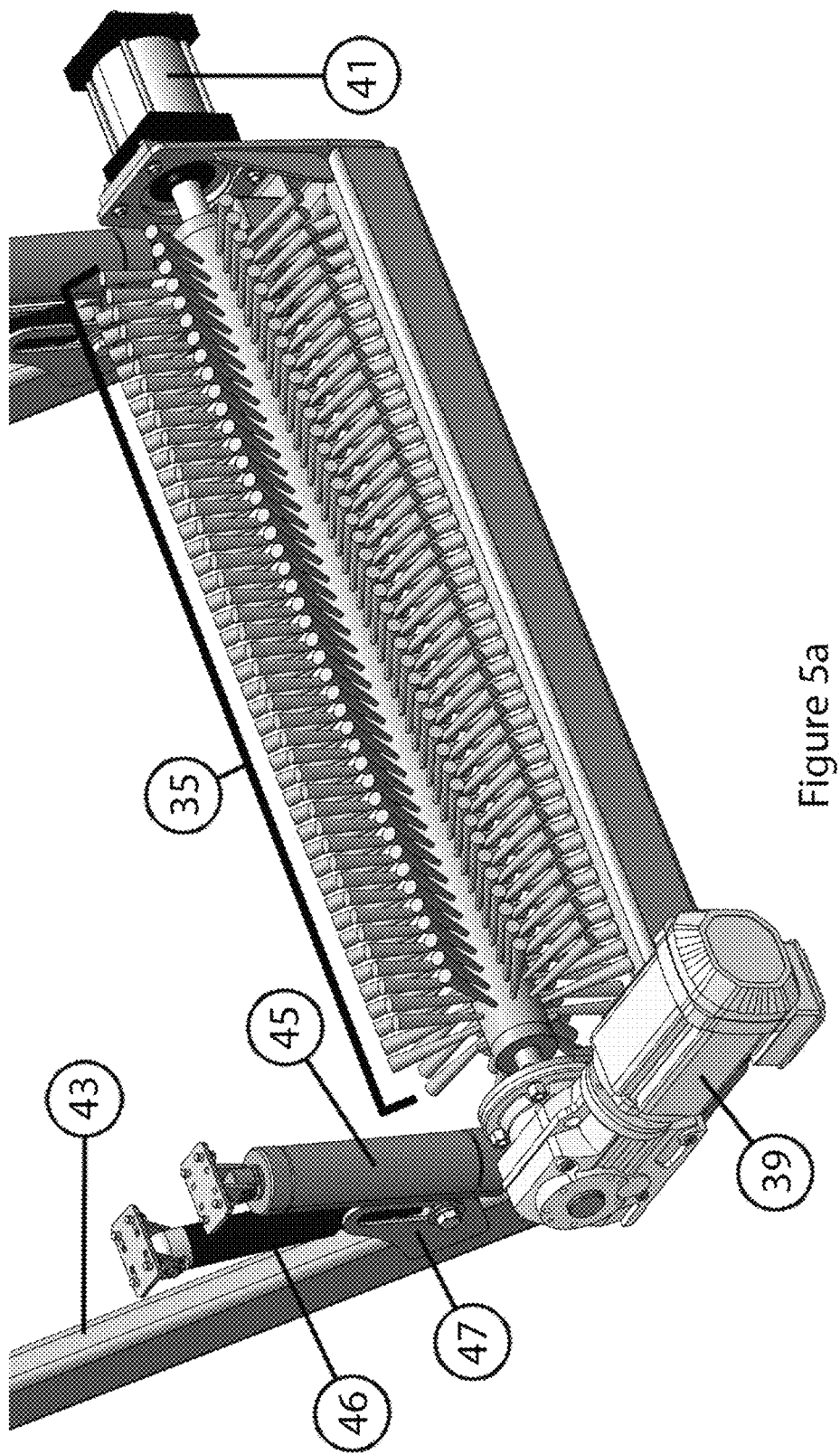
FIGS. 5a through 5d show isometric views of a cleaning mechanism that comprises a rotating brush, with FIG. 5a showing the brush apparatus in association with a frame that is part of the pan cleaning machine.
Figure 5B:
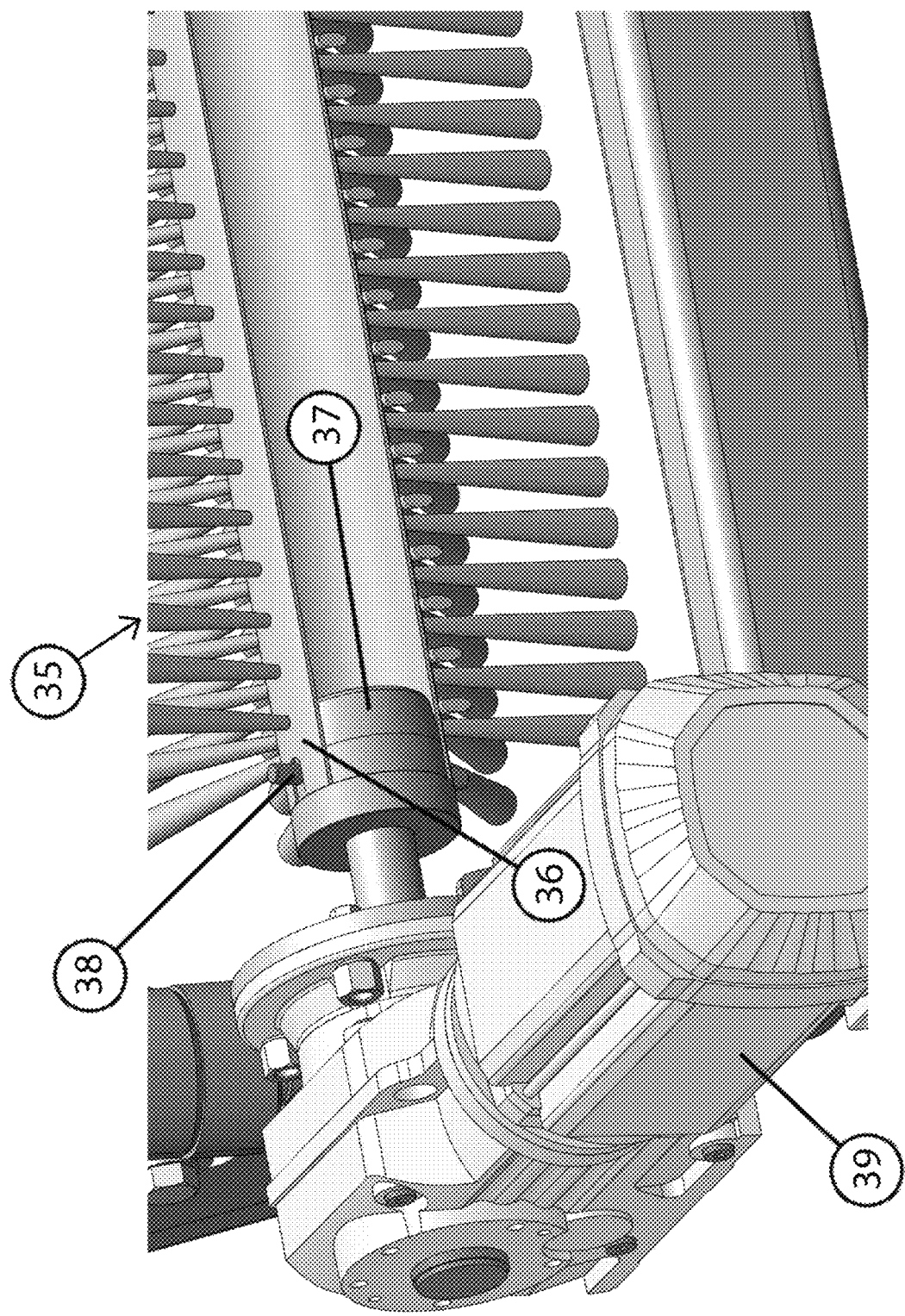
Figure 5C:
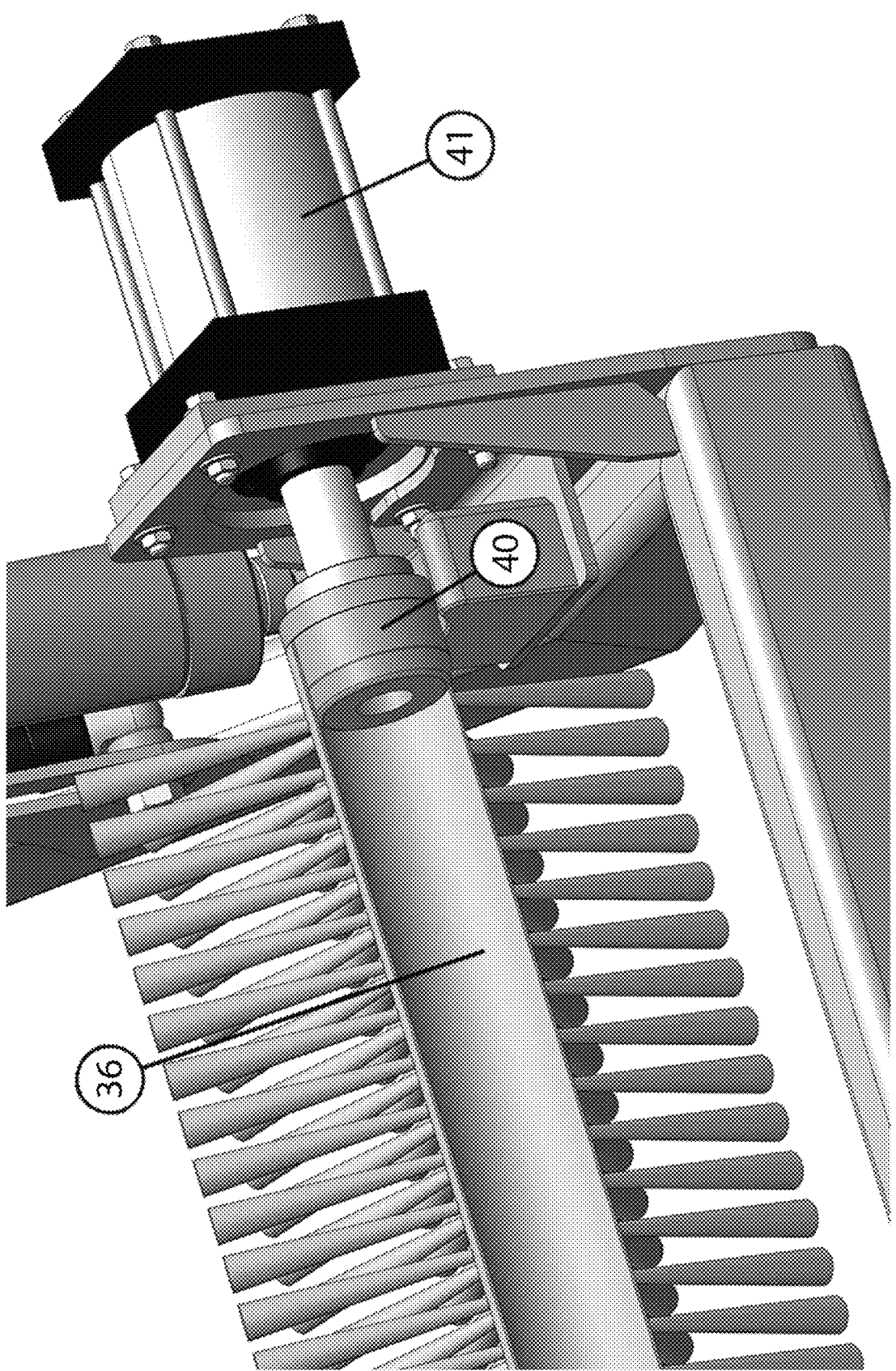
Figure 5D:
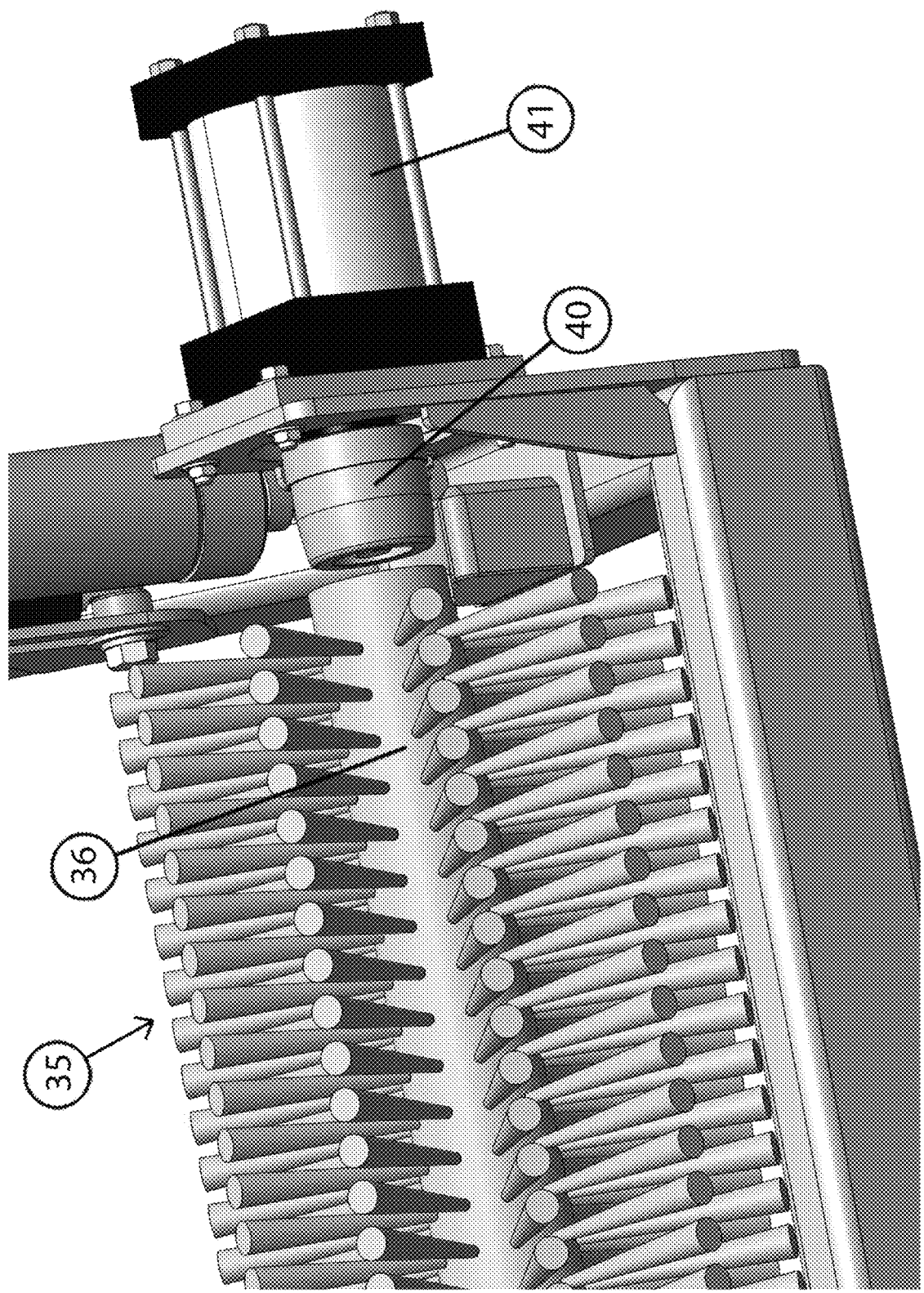

FIGS. 5b through 5c are views of the rotating brush assembly that have a section of brush shaft 36 cut away to show a quick-change arrangement for supporting rotating brush 35. Brushes have a life-cycle and need to be replaced when they are worn out. The life of some brushes can be prolonged if they are periodically cleaned to remove debris and grease that gets stuck to the shaft between bristle rows of rotating brushes and/or bristles. Conventional couplings can take a considerable amount of time to decouple to remove a brush and to install with a new or refurbished brush. With the arrangement shown in FIGS. 5b and 5c, location actuator 41 is employed to pull idler coupling 40 out of brush shaft 36 as shown in FIG. 5d. The retraction of idler coupling 40 provides sufficient clearance for brush shaft 36 to be pulled away from drive coupling 37. A new or refurbished rotating brush 35 can then be slid onto drive coupling 37 with a slot in brush shaft 36 aligned with dowel 38. Only one dowel 38 is shown in FIG. 5b but a plurality of dowels and slots can be employed to evenly distribute the transmission of rotational forces from drive coupling 37 to brush shaft 36. Other drive arrangements can be employed within the spirit of this disclosure, for example instead of dowel 38 rotational forces can be transmitted from drive coupling 37 to brush shaft 36 by matched gears and dedendum. When a quick-change arrangement is combined with the pivoting swing arm structure, this combination of features allows cleaning mechanisms to be quickly changed, or worn cleaning brushes to be replaced, without interrupting the operation of the pan cleaning machine.

Figure 6B:
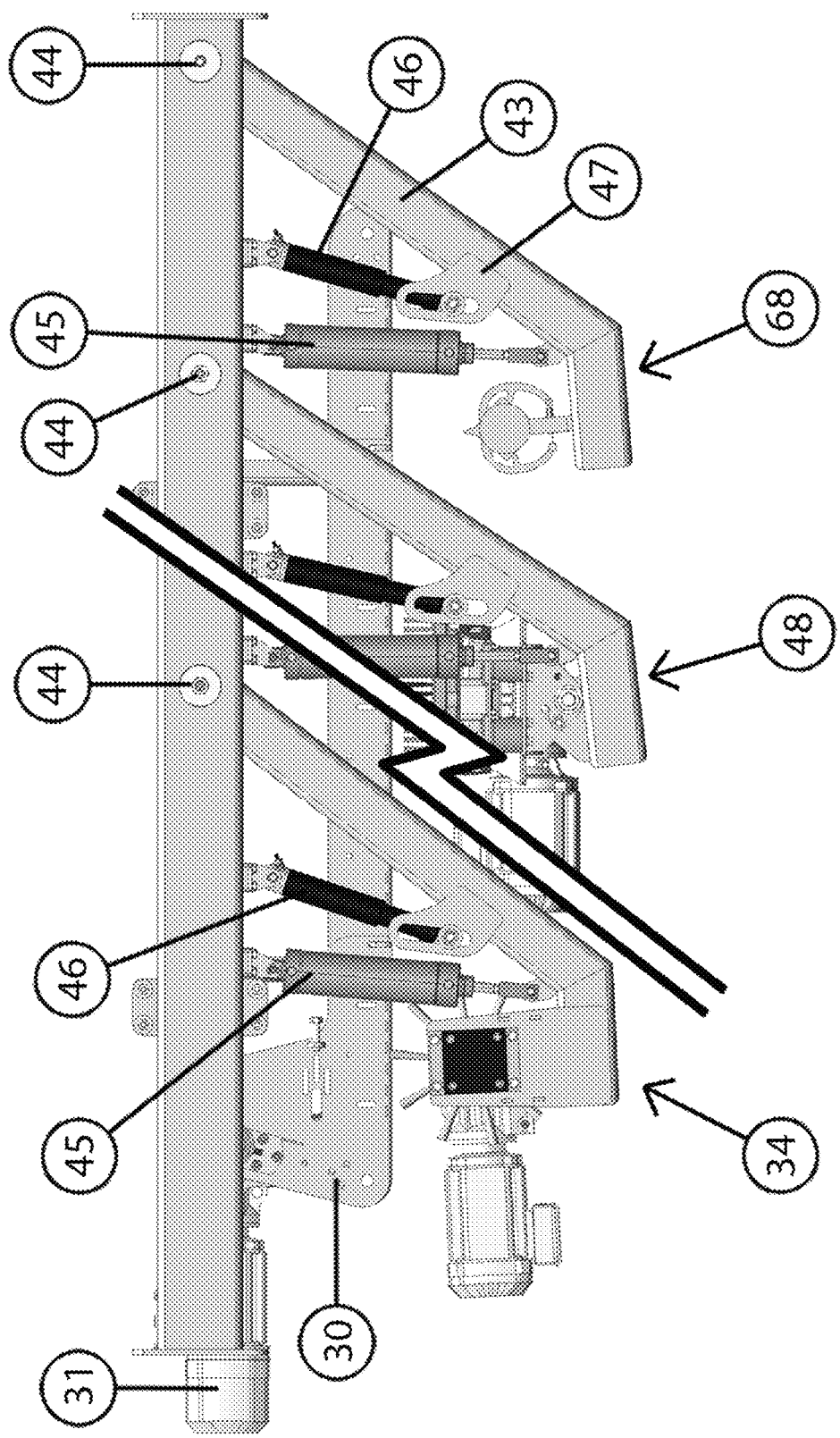

FIGS. 6a and 6b are views that show first cleaning mechanism 34 in relation to more of machine frame 42. So as to not obscure the depiction of first cleaning mechanism 34, second cleaning mechanism 48 has been deleted from this drawing but the swing arm pivot and the brackets for attaching the actuator and stroke limit controller are visible on the right-hand side of machine frame 42. In FIG. 6a opposite and above rotating brush 35 secondary holding magnetic conveyor 29 is attached to machine frame 42 by secondary conveyor frame 30. The surface of secondary holding magnetic conveyor that faces rotating brush 35 is on the same plane as the holding surface of carriages 7. Secondary holding magnetic conveyor 29 comprises two parallel tracks that are spaced apart to give enough clearance for carriages 7 to pass between. The speed of secondary holding magnetic conveyor is matched to the speed of carriages 7 so that when a carriage holding a baking pan approaches secondary holding magnetic conveyor 29 the baking pans are supported by both carriage 7 and secondary holding magnetic conveyor 29. The additional holding forces help to keep pans 1 from being dislodged from carrier 7 when subjected to the cleaning forces coming from the cleaning mechanisms. As shown in FIG. 6b secondary holding magnetic conveyor 29 can span the entire cleaning section 28 when there the pan cleaning machine comprises a plurality of cleaning mechanisms. Secondary holding magnetic conveyor 29 is driven by magnetic conveyor drive 31, that comprises a motor with a gear reducer, which drives one or preferably both parallel secondary holding magnetic conveyors 29 through a conveyor drive shaft that transmits rotational energy to linear tension motion through a drive shaft pulley which has a positive drive profile that can be used with a conventional timing belt to synchronize the belt speed of secondary holding magnetic conveyor 29 with carriage 7.

FIG. 6b shows the same three cleaning mechanisms shown in FIG. 1 but the cut line between first cleaning mechanism 34 and second cleaning mechanism 48 is intended to show that a pan cleaning machine can be made with a longer cleaning section 28 with a greater number of cleaning mechanisms. FIG. 6b also shows that the swing arm assembly for each cleaning mechanism is essentially the same, to facilitate modular interchangeability. The cleaning mechanisms can be different with different drive assemblies and different types of cleaning brushes or air knives or spray nozzles for washing fluids (not shown), but all can be attached to a support structure that comprises a pair of swing arms 43, that can be positioned for cleaning or removed from service by actuator 45, and with adjustment for pan depth by respective stroke limit controllers 46 connected to machine frame 42 and respective swing arms 43 through pins traveling in the respective slots of guide plates 47.

FIGS. 7a through 7f and FIGS. 8a through 8c show embodiments of second cleaning mechanism 48. Second cleaning mechanism 48 in this illustrative example is brush plate unit 50 is moved parallel to the horizontal plane defined by the baking surface of pans 1. The motion can be orbital, reciprocating, vibrating, or some combination of motions in the horizontal plane. The movements of can be controlled by a computer so that brush plate unit 50 follows a combination of movements that improves cleaning for the shape and style of pan that is being cleaned. For a brush plate unit to be actuated with a complex movement that includes more than one type of motion, such as both orbital motion and reciprocating linear back and forth scrubbing, the actuation assembly can use two different drives so that an orbital drive is turned on for orbital motion and a reciprocating drive is turned on for reciprocating motion and a combination of movements can be achieved by operating both drives at the same time or one drive sequentially after the other drive. Considering the time that each cleaning mechanism has to work on each pan, in some embodiments it can be better to have two cleaning mechanisms with brush plate units, one that moves in an orbital motion and one that moves with a reciprocating motion. In addition, without limitation, variables in the programmed movements can include amplitude of reciprocating movements, frequency, velocity (constant or variable), the radius of orbital motions, reversing the direction of orbital movements, and pressure (which can be controlled by adjusting the spacing between brush plate unit 50 and pan 1.

Figure 7A:
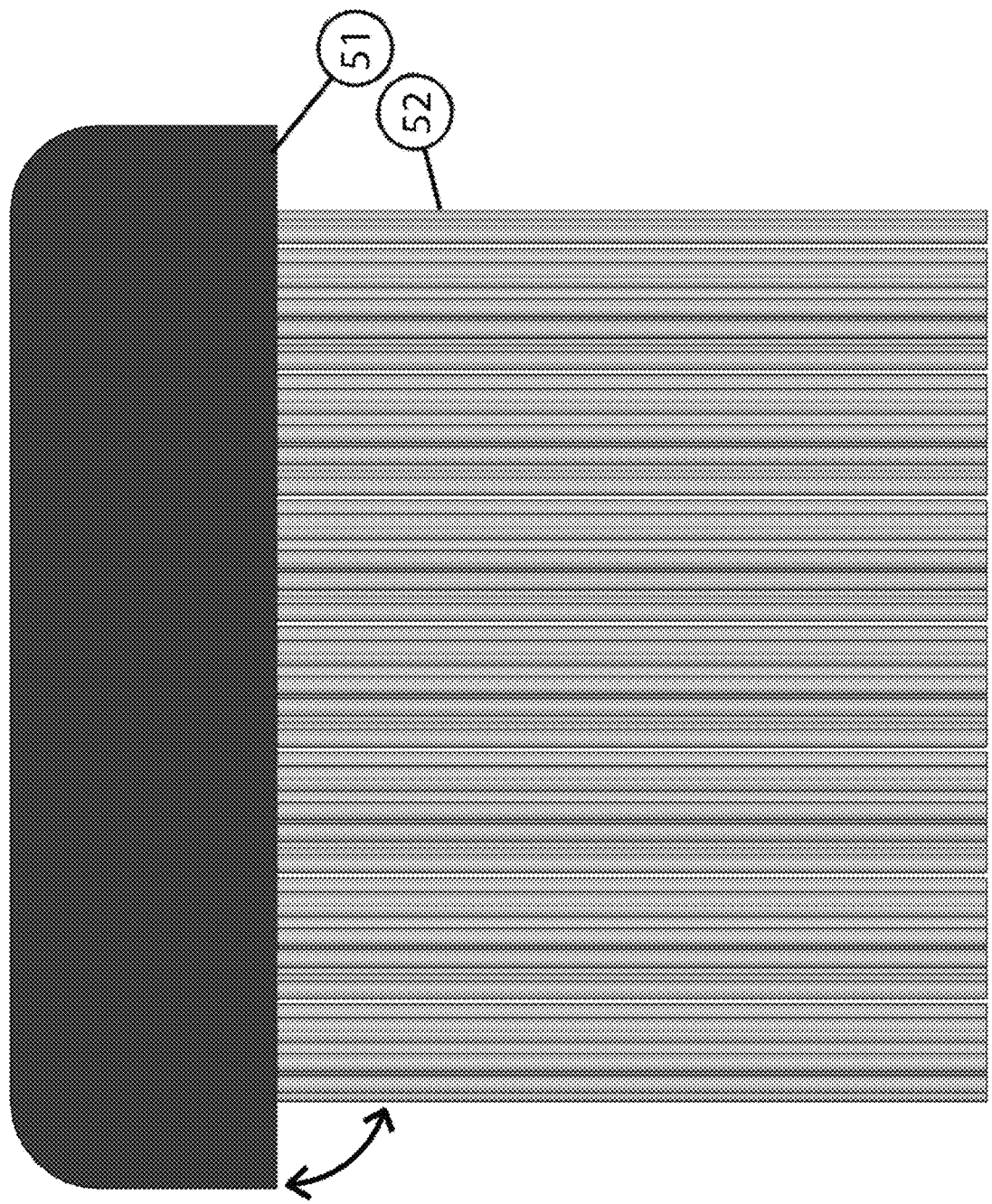
FIG. 7a depicts a side view of a brush plate unit with bristles that extend perpendicularly from a base that can be mounted to a cleaning mechanism of a pan cleaning machine.
Figure 7B:
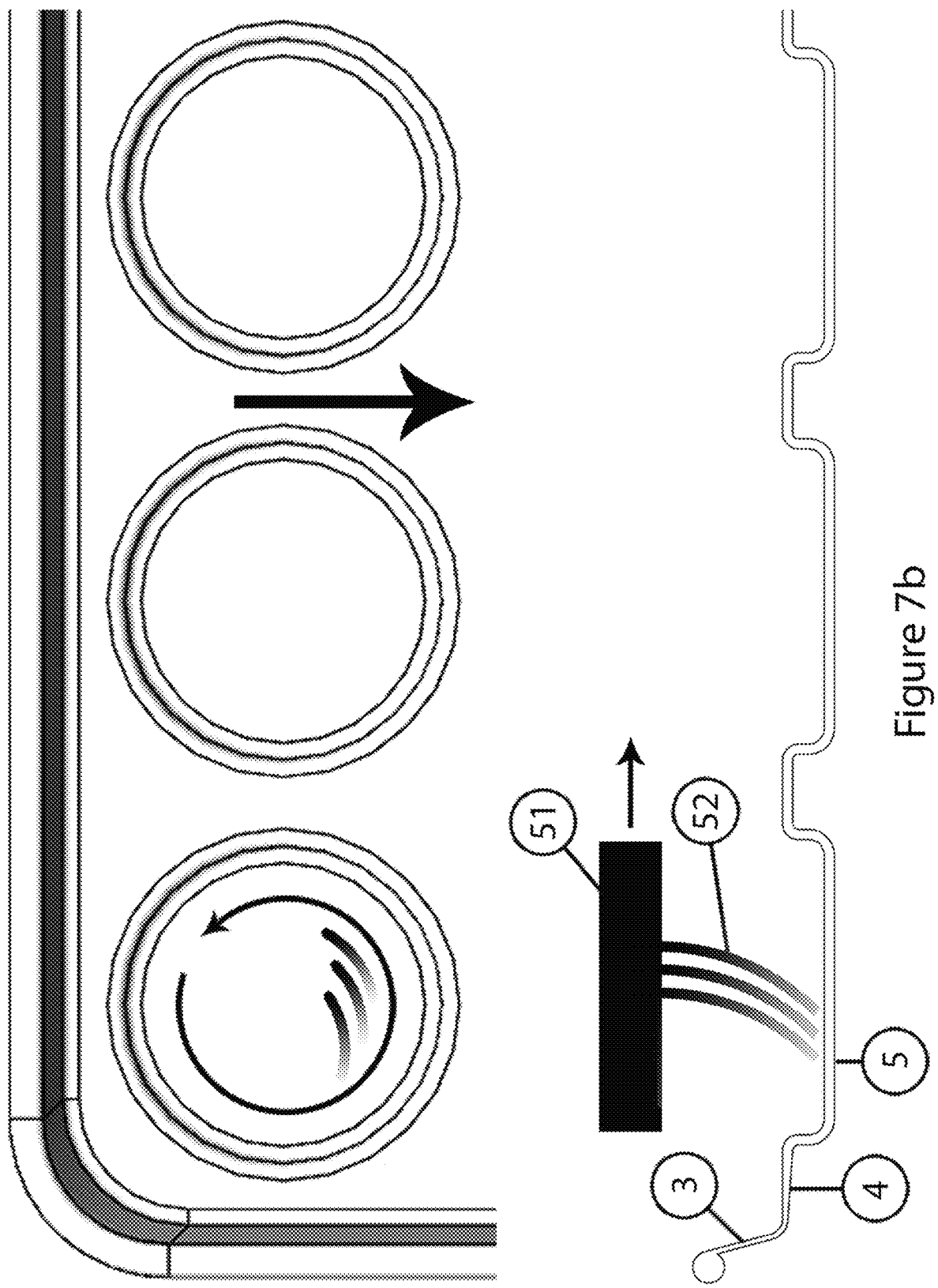
FIG. 7b shows a side schematic view and a top view of the baking pan with the brush plate unit of FIG. 7a being applied to a baking pan.

FIGS. 7a through 7d depict a brush assembly with bristles 52 that extend perpendicularly from brush 51. FIG. 7b through 7d show a schematic side view of brush plate unit 50 applied to the baking surface of baking pan 1. Not all of the bristles are shown in these schematic views, a brush plate unit will have a plurality of rows of bristles. The schematic figures are intended to show how each row of bristles 52 engage with baking pan 1. Bristles that are installed to extend perpendicular to the brush base will bend in the opposite direction to the direction of movement, in a sweeping action, like a broom sweeps a floor. In FIG. 7b, above the side view there is an overhead view of the baking surface of baking pan 1, which has raised perimeter 3, flat portion 4 and pockets 5. The corners, the transition between raised perimeter 3 and flat portion 4, and small diameter contours between the bottom and sides of pockets 5 can be hard to reach for cleaning by rotating brush 35 of first cleaning mechanism 34, but can be reached by the bristles of brush plate unit 50. In the overhead view in FIG. 7b the arrows show examples of movement directions for brush plate unit 50, for example circular/orbital for directing bristles 52 in the small contour corners in pockets 5 and transverse to the pan for scraping or sweeping flat portion 4. As shown in FIG. 7b by setting the stroke limit controller 46 the height of brush plate unit 50 can be set so that bristles 52 can reach the bottom of pockets 5. In some applications the height of brush plate unit 50 can be set with enough clearance so that the baking pan does not get jammed between brush plate unit 50 and carriage 7 and so that the bristles are not bent beyond their elastic limits, but at a height that is less than the length of bristles 52 so that the bristles are bent to apply more scrubbing pressure when cleaning pan 1. As shown in FIGS. 7c and 7d, for a flat pan that has debris 2 that is more easily swept away, brush base 51 can be held further away with bristles 52 more or less straight when brushing flat surface 4 and bending mostly when coming into contact with debris 2. While this sweeping action can be effective in some applications, for other applications a scraping action can be more effective.

Figure 7E:
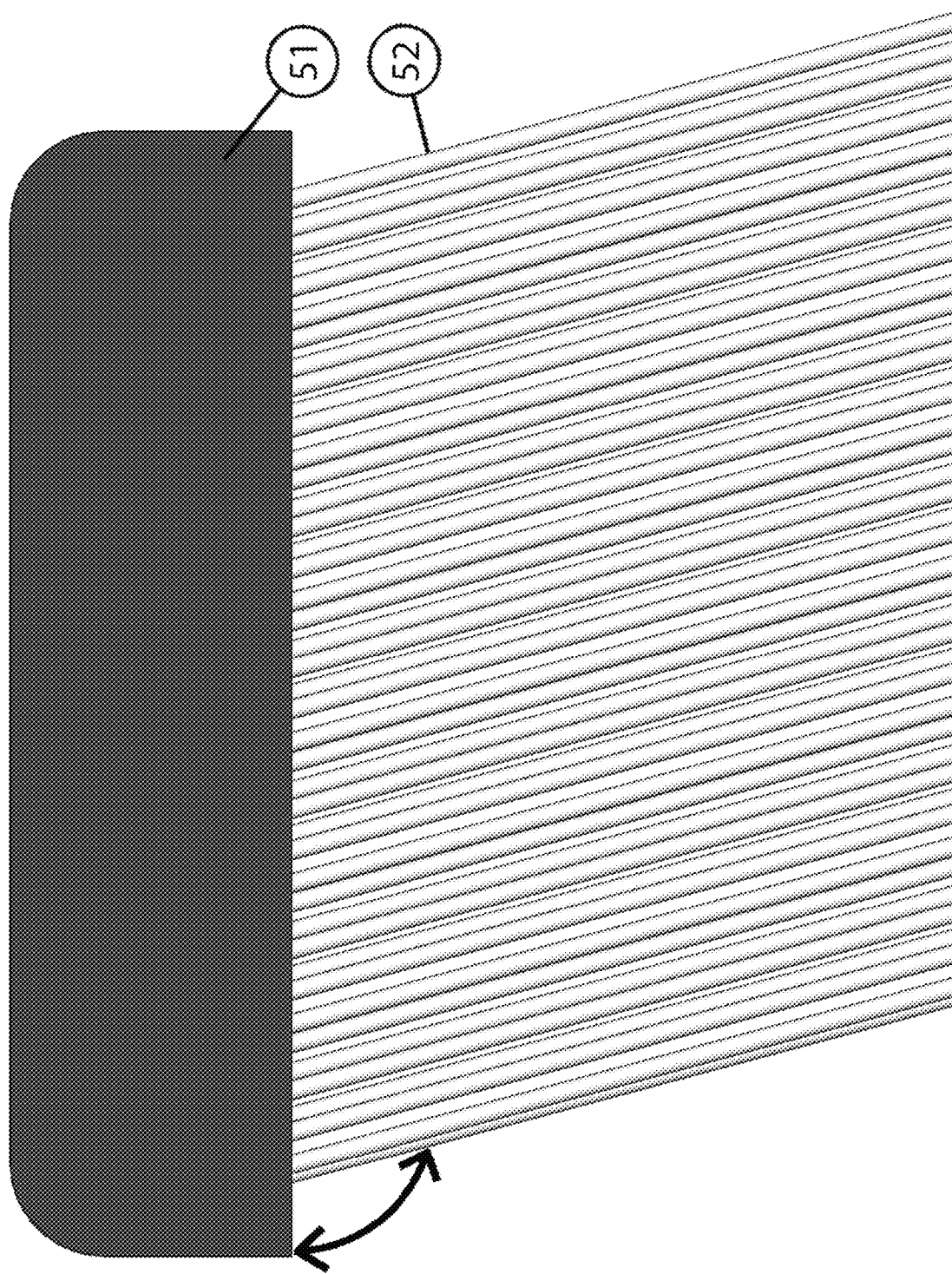

FIGS. 7e and 7f, schematic side views show an alternative arrangement for a brush plate unit that has bristles 52a that extend from brush base 51 at an angle, so that when brush base 51 moves in relation to pan 1 in the direction of angled bristles 52a (as shown in FIG. 7f), instead of the sweeping action shown in FIG. 7d, bristles 52 work with a scraping motion to remove debris from pan 1. Even with the orientation of angled bristles 52a, if bristles 52a are not stiff enough they will still bend so that the tips of the bristles will point opposite to the direction of travel, and again sweep the surface of pan 1. Accordingly, with this angled bristle arrangement, bristles 52a need to made with enough stiffness to prevent them from bending backwards. In addition, the spacing between brush base 51 and pan 1 can also help to keep bristles 52a from bending backwards by urging the bristles to have a bend as shown in FIG. 7f, but if positioned too close, the tips of bristles 52a can be bent to curve away pan 1, reducing the scraping effect. Accordingly, with cleaning mechanisms that use a brush plate unit, the spacing between the brush plate unit and the pans is very important for achieving the desired cleaning, which makes stroke limit controller 46 an important feature when a pan cleaning machine is made to clean a variety of different pan types and there is a need to set the best spacing between the cleaning mechanism and the pan for each type of pan. FIG. 7f, being a schematic view demonstrates how an angled bristle can be more effective at scraping debris, and in brushes using this feature are made by boring holes at different angles for insertion of the bristles. That is, in actual brush arrangements the bristles can be arranged to provide a combination of brushing effects with some holes drilled perpendicular to the brush base, with other holes drilled at angles between zero and 90 degrees with most being 10 to 30 degrees from a perpendicular line extending from the brush base. So that whichever direction the brush is moving, there will always be some bristles that are moving with a scraping action, and when the brush reverses or otherwise changes direction, other angled bristles will move with a scraping action that can plow and shear debris from the baking surface. Bristles near the edge of the brush can be oriented between 20 and 60 degrees from a perpendicular line extending from the brush base. These bristles can be made with a higher angle of inclination so that they can extend from the sides of the brush to contact and scrub the sides of raised perimeter 3.

Figure 8A:
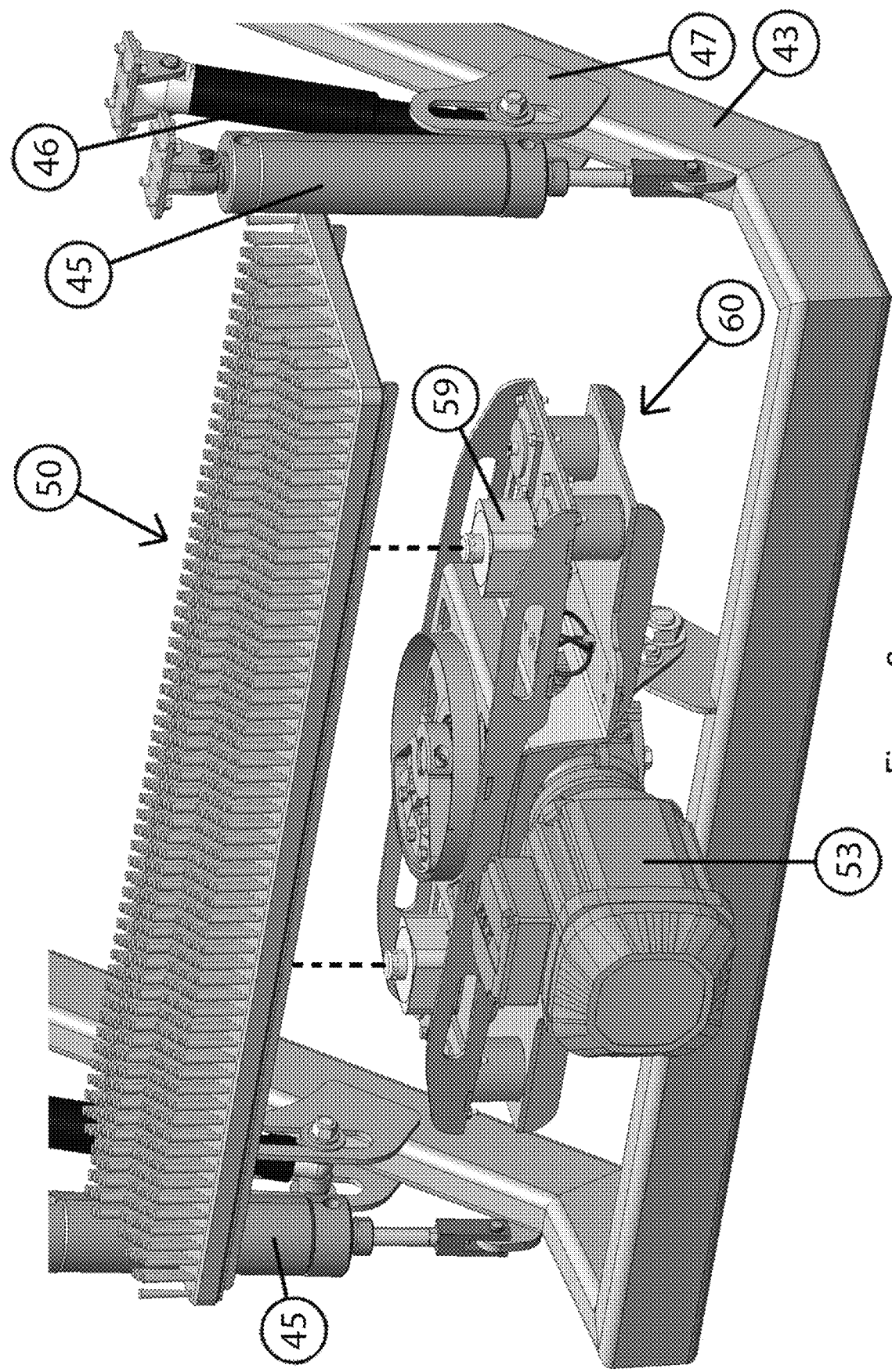
FIGS. 8a through 8c show views of a cleaning mechanism that comprises a brush plate unit with stepped bristle heights.
Figure 8B:
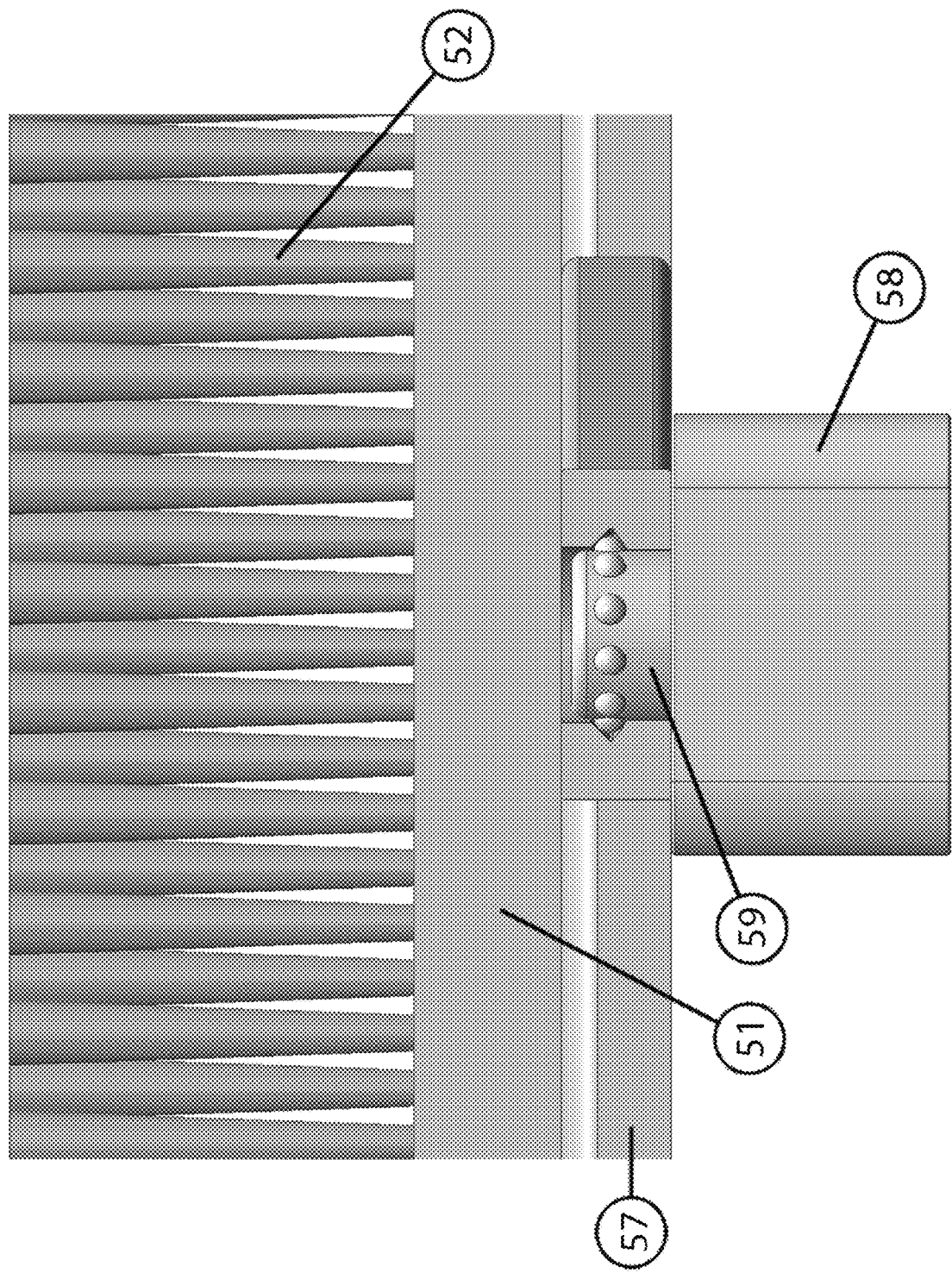
Figure 8C:
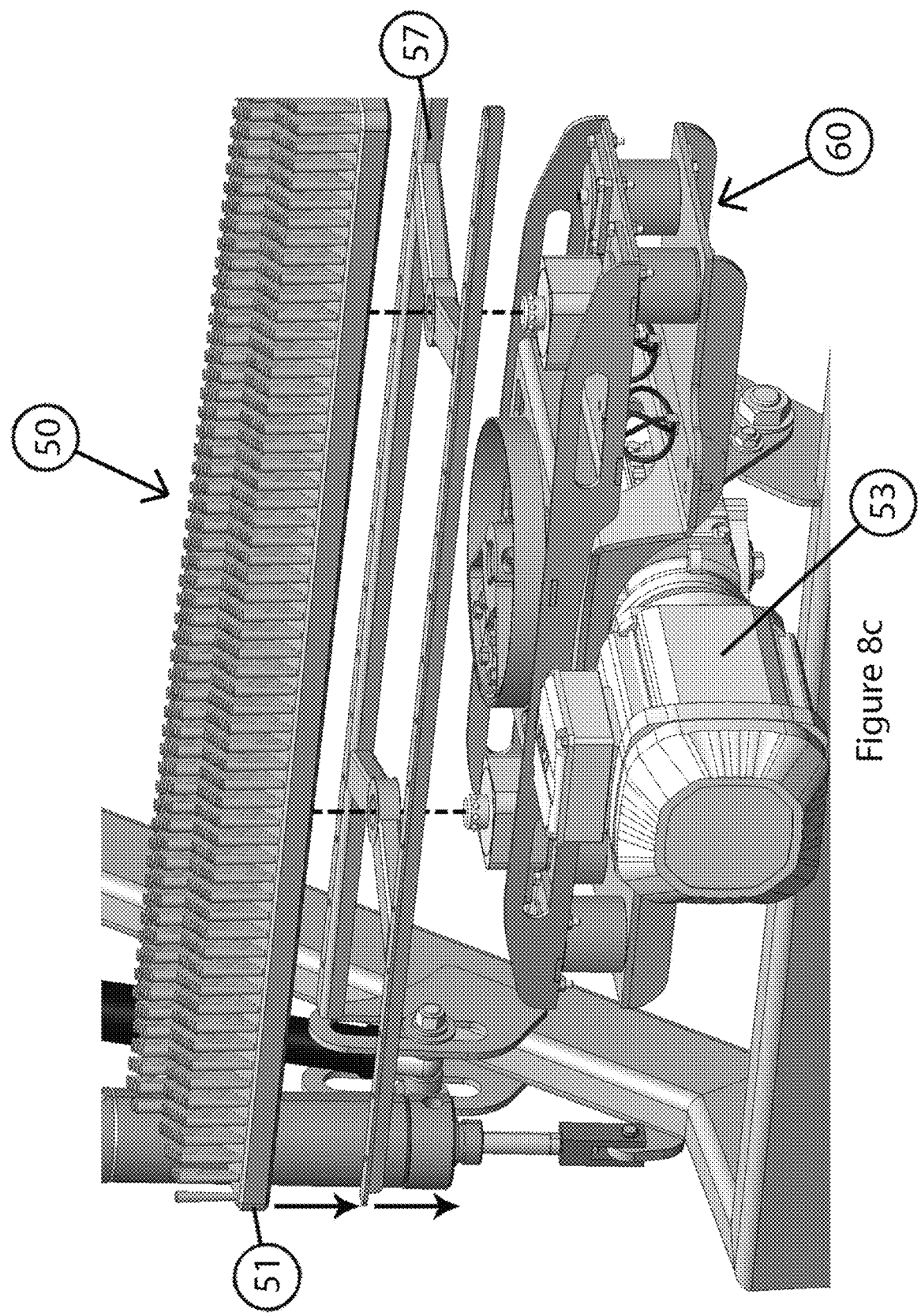

FIGS. 8a and 8c show yet another embodiment for a brush plate unit. In this embodiment the bristles on the leading edge of the brush plate unit are shorter than two rows of bristles in the middle of the brush plate. An arrangement with a stepped bristle length with two or more different bristle heights can be advantageous for cleaning pans with recesses such as pockets 5 in the pan shown in FIG. 7b. The shorter bristles on the leading edge and trailing edge can be made to a length suitable for cleaning flat portion 4. For better cleaning, the shortest bristles preferably have a length that is longer than the spacing between the brush base and flat portion 4 so that the bristles bend in the elastic deformation range of the bristle material, for better cleaning. The longer bristles can be made to a length suitable for cleaning the bottom of pockets 5. The longer bristles will be bent more than the shorter bristles when the bristles encounter raised perimeter 3 and flat portion 4, so the longer bristles are made to a length that will not result in bending beyond the material elastic limit, or instead of limiting the length, the longer bristles can be made from a material with a higher elastic limit or with a different diameter for higher elasticity. For example, bristles made from UHMW will bend and can retain a bent shape whereas bristles made from nylon have a better memory for returning to their original shape. Bristles made with a thicker diameter have a higher stiffness and a brush plate unit can be made with more than one type of bristle in addition to different bristle lengths and orientations. As an illustrative example, a baking pan that is substantially flat can have a raised perimeter that rises 1 inch (about 25.4 mm) from the flat pan surface. For the bristles of brush plate unit 50 to pass over this raised perimeter without bending beyond the permanent bending limits, and still reach flat surface 4 of baking pan 1, the bristles on the leading edge of the brush can be made 4 inches (about 101.6 mm) long. For the bristles that need to reach the bottom of pockets or other recesses formed into the baking pan, if the recess is ½ inch (about 12.7 mm) brush plate unit 50 can be equipped with longer bristles at the trailing edge that are about 4½ inches (about 114.3 mm) long to reach the lowest surfaces of the recesses. It will be understood that these dimensions are illustrative examples and other variables can influence the length of the bristles such as, without limitation, the spacing between the brush plate and the baking pan, the tendency of the baking pans to warp or otherwise take on deformed shapes, the elastic limit of the bristle material and other material properties of the bristles, such as thickness or stiffness as this could determine how much deflection of the bristles is desired for causing the bristles to perform the work of scrubbing the pan surfaces to remove the debris or other residue from the pan surfaces, and the spacing between the bristles. In addition, FIGS. 8a and 8c show only one example of an arrangement for a brush plate unit that has two rows with longer bristles, and it will be understood that brush plate units can be made with other arrangements, some with more rows of longer bristles, some with an oscillating profile, meaning a pattern with number of rows with shorter bristles, then a number of rows with longer bristles, then a number of rows with shorter bristles, then a number of rows with longer bristles, followed by a number of rows with shorter bristles. The longer bristles can also be confined to areas in predetermined rows parallel to the direction of pan movement, with such rows aligned with the location of pockets in the pans. When cleaning pans with a raised perimeter it is best not to put the longer bristles on the leading or trailing edge of the brush plate unit because this can tip the pan of the forces that hold the pan on the carriage are not strong enough.

FIGS. 8a through 8c also show exploded views to illustrate how brush plate unit 50 is mounted to brush drive assembly 60, which is attached to a swing arm assembly that can be made the same or similar to the swing arm assembly already described in relation to the first cleaning mechanism. The drive system of the brush drive assembly comprises brush plate driver motor 53, which is coupled to mechanisms that convert the rotational motion generated by the brush plate driver motor 53 to motion in a two-dimensional plane parallel to the plane defined by brush base 51. For generating orbital motion, one embodiment uses brush plate motor driver 53 to rotate an eccentric that is compensated in weight balance by an eccentric mounted counterweight and movement of brush frame 57 is followed in motion by a load aligner that ensures that brush frame 57 rotates as desired instead of moving in a flat plane rotational harmonic and/or a harmonic perpendicular to the plane. Brush base 51 is attached to brush frame 57, shown in FIG. 8c. Brush frame 57 provides a structural connection between brush base 51 and support block 58 of brush drive assembly 60, by means of hub retainer 59 which is designed to engage with a receiving bore in brush frame 57. Hub retainer 59 is shown with a quick release arrangement that comprises ball bearings that are biased in a locked position (shown) by protruding from the cylindrical surface of hub retainer 59 and being seated in an annular recess in the receiving bore of brush frame 57. A spring-loaded tapered pin disposed inside hub retainer 59 holds the ball bearings in the locked position. To remove the brush plate unit, compressed air or a mechanical tool can be used to pull the tapered pin against the spring force that holds the tapered pin and the ball bearings in the locked position. With the tapered pin displaced, the ball bearings slide towards the centerline of the retaining hub (and away from their locked position in the annular recess). Once the ball bearings have rolled to a position within the body of hub retainer 59, brush frame 59 and the attached brush plate unit can be lifted from hub retainer 59. The described quick-release arrangement is demonstrative without being limiting, since other methods of attaching components to a machine in a manner that allows quick removal and installation are well known. With the swing arm assembly that supports second cleaning mechanism 48, the swing arm actuator can be used to pivot the brush plate unit away from the pan cleaning line so that maintenance can be done. Retaining hub 59 permits a "no tool" quick release so that a worn brush plate unit can be quickly removed and replaced with minimal stoppage time. The design of the quick-release arrangement shown in FIG. 8b is an enabling example, but it will be understood that this design could be modified or a different quick-release design could be substituted within the spirit of the disclosed quick-release concept. While arrangements that require tools are less convenient, a quick-release arrangement that requires only ordinary tools can also be an advance over machines now in use that use more conventional couplings. That is, if a more secure retention means is desired, the quick-change concept can still be realized by a hub that uses a transverse retainer pin screwed through brush frame 57 and into a transverse bore in hub retainer 59. These types of pins that are screwed in can be prone to overtightening so an alternative to this is to use a cotter pin as the retainer pin, with the cotter pin extending through a bore from one side of the brush frame collar through the hub to the other side of the brush frame collar. To remove brush plate unit 50 then the cotter pin is removed (without tools), and then brush plate unit is free to be removed, and removal is still much quicker than the undoing of more conventional couplings.

Figure 9A:
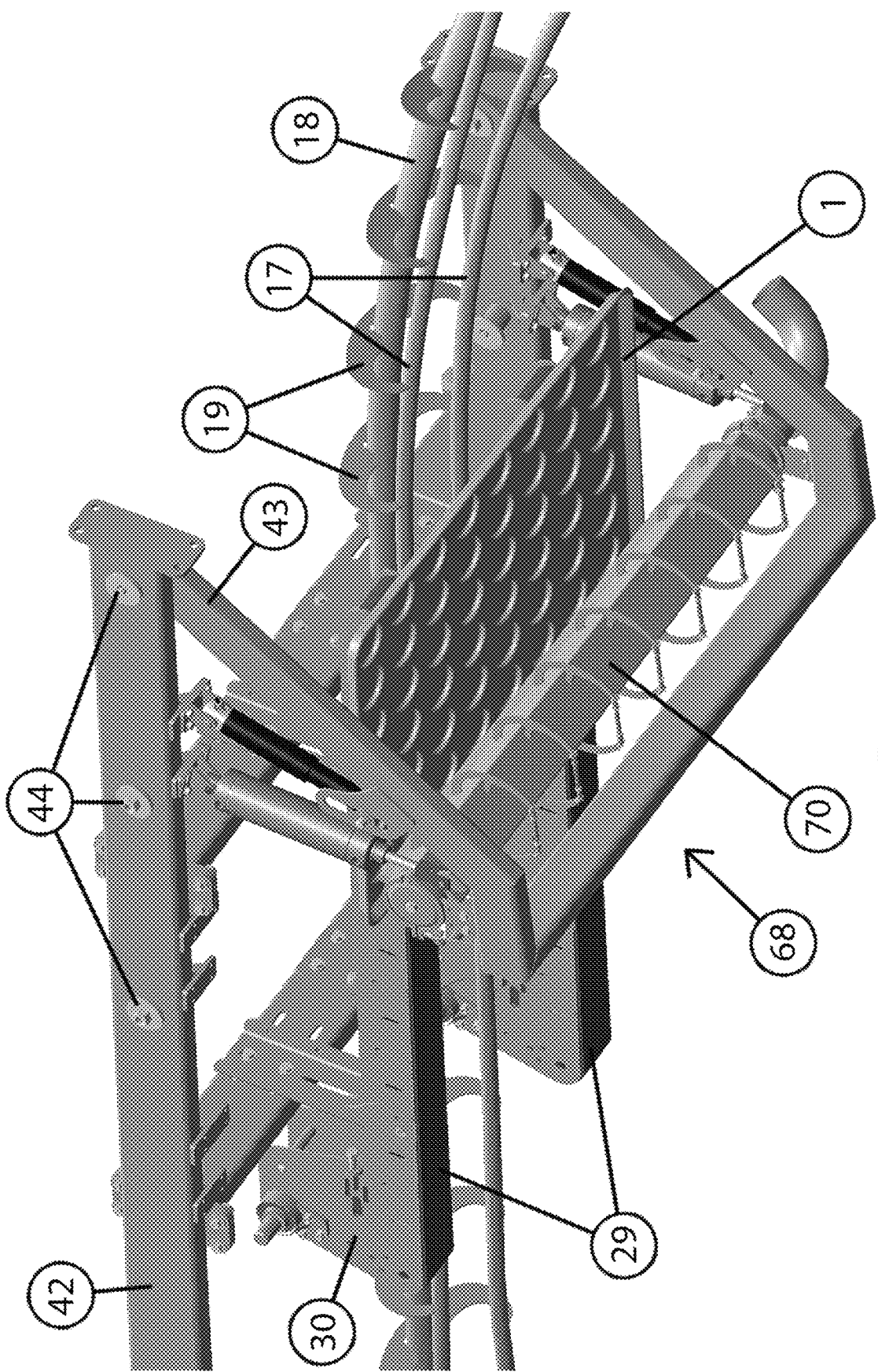

FIGS. 9a through 9d show views of third cleaning mechanism 68 that comprises air knife assembly 70. With the described modular pan cleaning system, depending upon the needs of the application, air knife assembly 70 can be replaced with a different cleaning mechanism. In FIG. 9a, air knife assembly 70 is shown supported by the same swing arm assembly that has been in other figures supporting the first and second cleaning mechanism. In FIG. 9a the first and second cleaning assemblies have been removed to simplify the view of third cleaning mechanism 68 but on machine frame 42, still shown are swing arm pivots 44 and the attachment brackets for the actuators (not shown) and stroke limit controllers (not shown). This view shows how compact the spacing can be between cleaning mechanisms. FIG. 9a does show baking pan 1 positioned above air knife assembly 70 in a tipped orientation. The carriage cannot be seen above pan 1, but tracks 17 and frame member 18 are shown extending between the two belts of secondary holding magnetic conveyor 29. Air knife assembly 70 comprises nozzle outlet 72 which can be a narrow slot through which compressed air is directed onto baking pan 1. Preferably nozzle outlet 72 is oriented so that the air blowing onto baking pan 1 blows any remaining debris in a direction counter to the direction that baking pan 1 is moving on carriage 7. That is, blowing debris in the direction of where the pans are coming from, not in the direction of where the clean pans are taken, to reduce the chance of debris being blown onto baking pans that have just been cleaned.

Figure 9C:
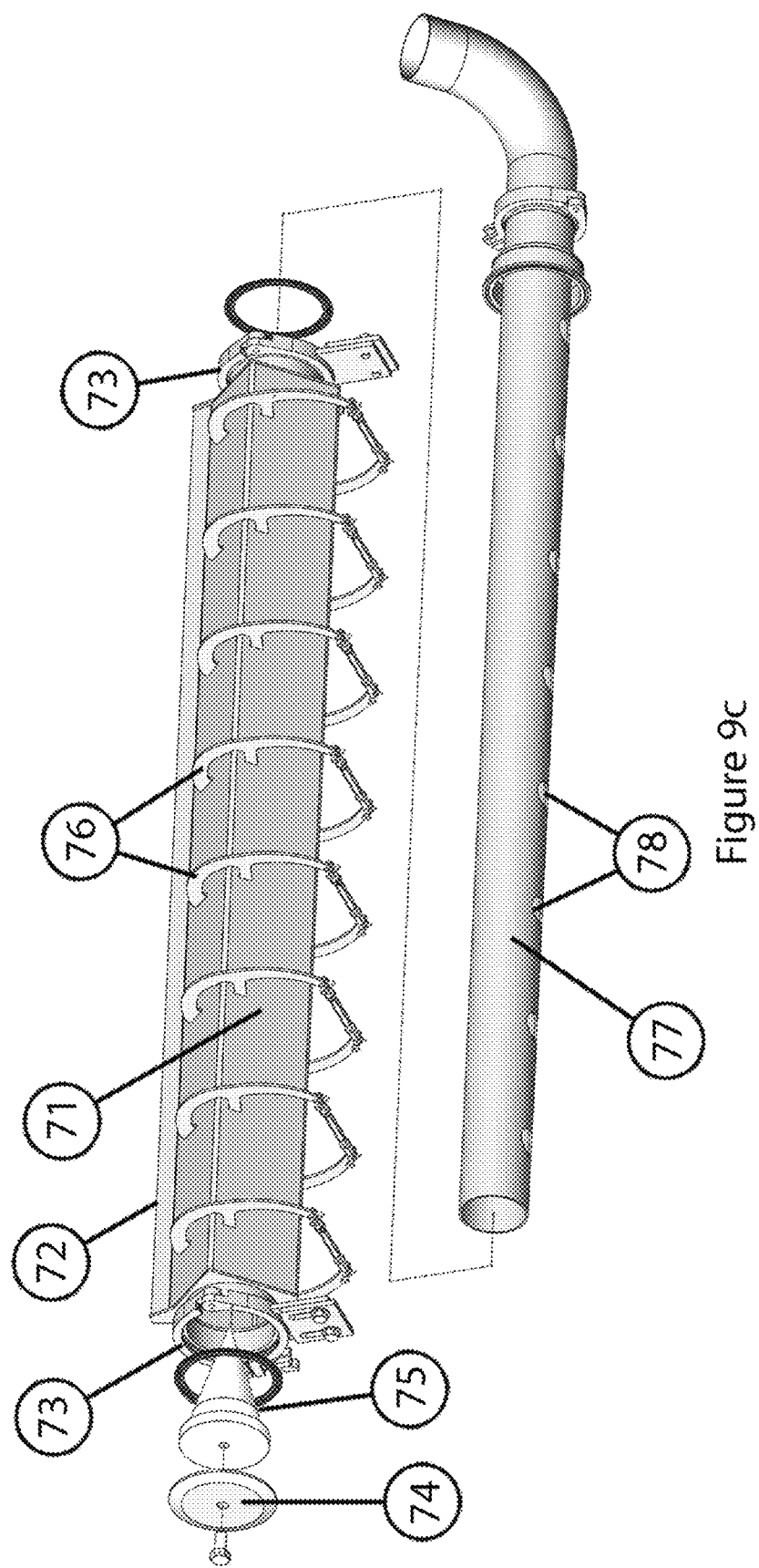
Figure 9D:
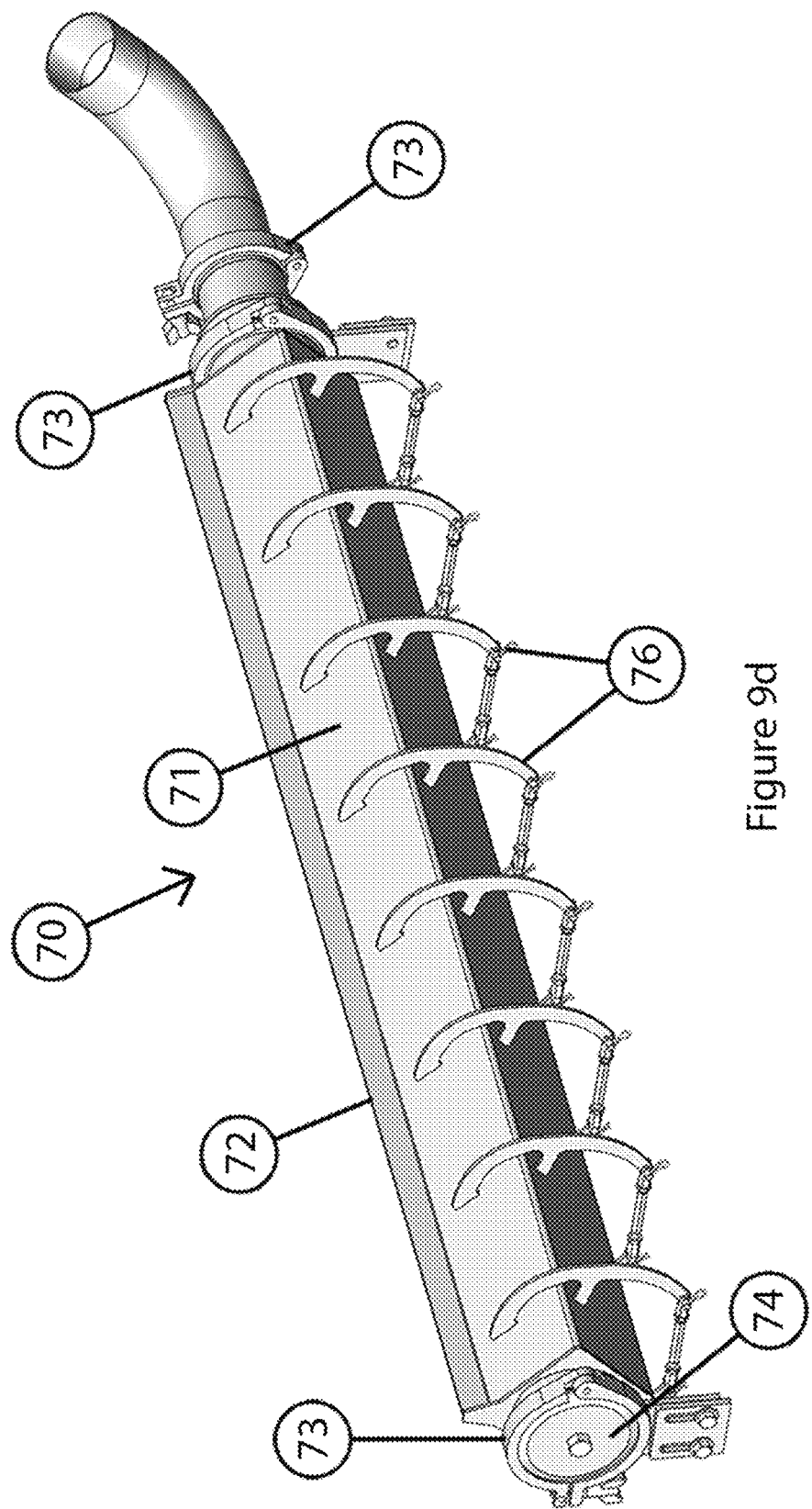

FIGS. 9b through 9d are views that show the component parts of air knife 70. An air knife is a nozzle design for a blower that will have a narrow slot for an opening and an outside housing shaped to entrain air that joins the compressed air to increase the amount of air and the force of the blowing action onto pan 1 from nozzle outlet 72. Air knives themselves are not new but known air knives can be improved by making them easier to clean and by making them more adjustable to focus the blowing action for improved performance. In the illustrated design, all of the surfaces of the air knife are accessible for cleaning, which is important for bakeries and other industrial processes that handle food. Outer housing 71 can be made from stainless steel and perimeter clamps 76 are accessible for cleaning. Each perimeter clamp 76 pivots on a middle arm with an upper arm acting on an elongated metal outlet plate that defines a side of the opening for nozzle outlet 72. Perimeter clamps 76 have a pair of threaded adjusters at the lower end, which are used to operate perimeter clamps 76 to adjust the position of the elongated metal outlet plates to change the size of the nozzle opening to achieve the desired blowing action at different sections along the length of nozzle outlet 72. For example, depending upon the application and the type of pan being cleaned, sometimes it is desirable to increase the size of nozzle outlet 72 along its entire length or at certain sections to increase the air flow. In some cases, in certain areas it is desirable to restrict or close the nozzle outlet to reduce air flow where it is not required or where a gentler blowing action is desired. The end view in FIG. 9*b* shows end cap 74 and tri-clamp 73 from which a bracket extends with two slotted openings for receiving fasteners to attach air knife 70 to the swing arm assembly. FIG. 9*c* is an exploded view of air knife 70. Guiding support block 75 is mounted to end cap 74 and can have a tapered shape to guide the inner end of diffuser tube 77 into position while also supporting and sealing it once in the assembled position. When assembled, as shown in FIG. 9*d*, end cap 74 is held in tri-clamp 73, clamping a gasket between end cap 74 and a flanged end of outer housing 71. Once air knife 70 is assembled, compressed air can be fed into the interior of outer housing 71 through diffuser tube 77. The compressed air that enters the interior of outer housing 71 through air ports 78 entrains air as it flows to nozzle outlet 72.

Figure 10A:
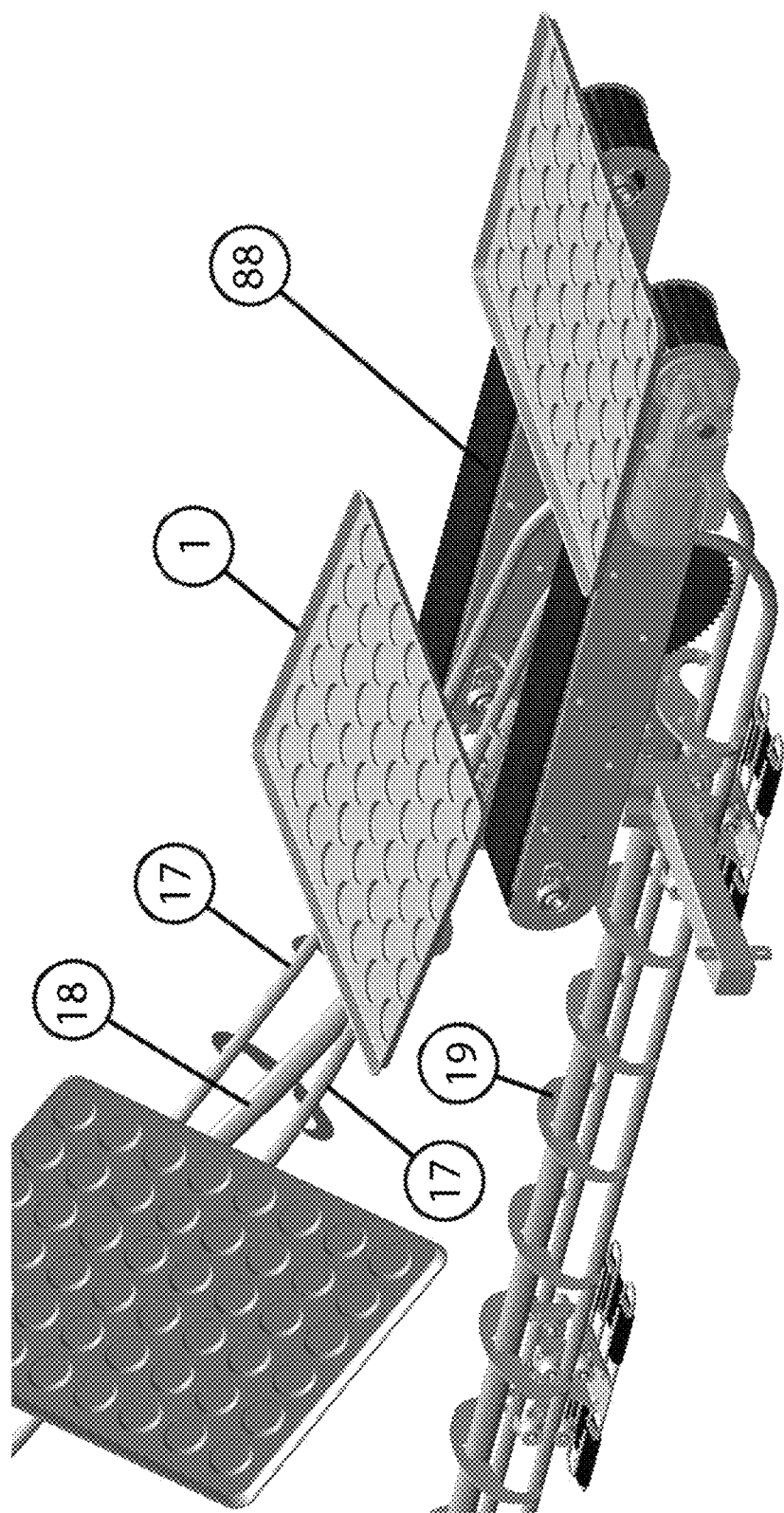
FIGS. 10a through 10c shows a portion of the pan cleaning machine where cleaned pans are deposited onto a take-away conveyor belt.
Figure 10B:
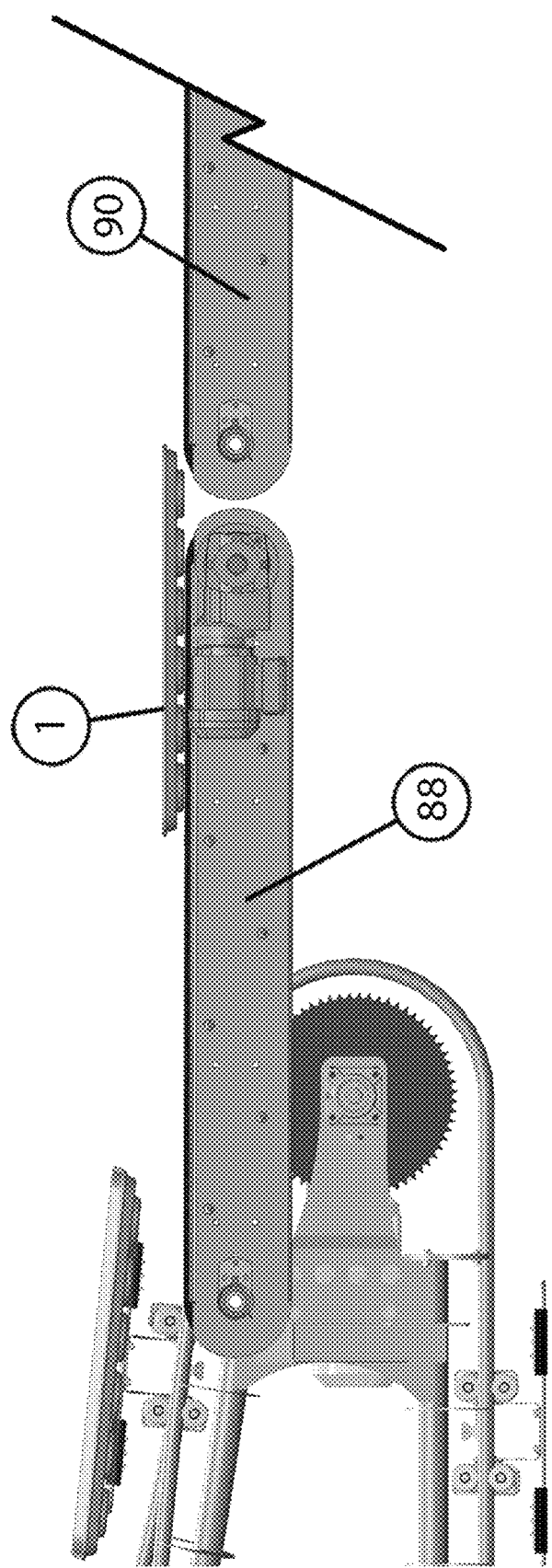
Figure 10C:
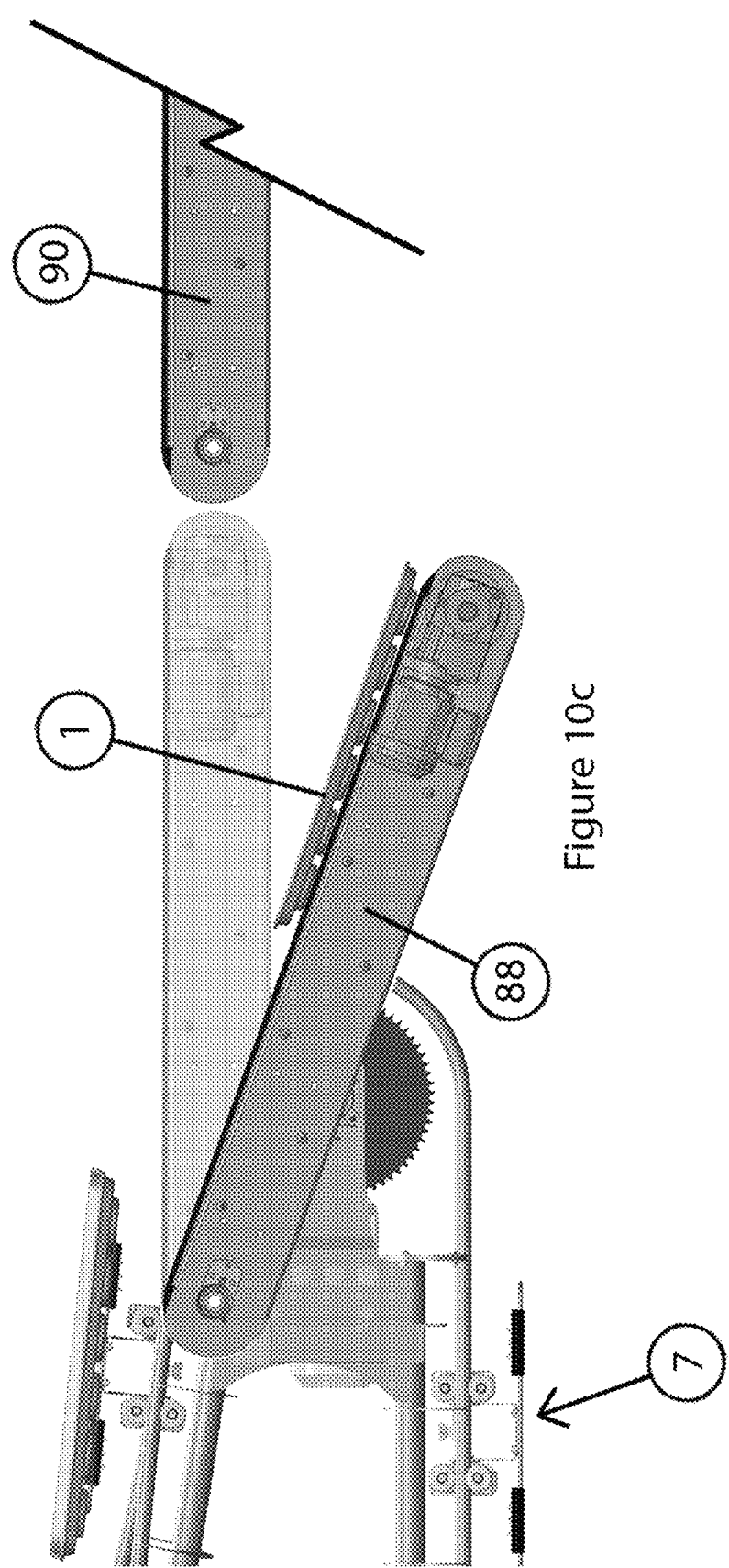

FIGS. 10*a* through 10*c* shows a section of the pan cleaning machine after cleaning section 28, where cleaned pans are deposited onto take-away conveyor belt 90. FIG. 10*a* is a perspective view that shows two pans on carriages (not visible underneath the pans) and a third pan deposited on optional diversion conveyor 88 with the baking side of baking pan 1 facing upwards. Depending upon the bakeries needs, track 17 can alternatively be arranged to deposit baking pans 1 onto diversion conveyor 88 in an inverted position with the baking side of baking pans 1 facing down. Diversion conveyor 88 can pivot to separate pans onto different paths. For example, in a bakery that uses a plurality of pan types, diversion conveyor 88 can be actuated to pivot to alignment with two or more take-away conveyor belts. A camera or other device can be used to detect the type of pan so that it can be diverted to the correct path. In another embodiment, a camera can be used to detect pans that need to be taken from service so that diversion conveyor can be aligned with a path for removing pans from service. For example, a pan could still be dirty after exiting the pan cleaning machine because of burnt on debris, or a pan could be badly warped or bent to a degree that it is taken out of service. Some pans can include a luminescent material in the pan glaze so that when a light emitter is directed at the pan in the discharge section of the pan cleaning machine, the luminescent material lights up, making it easier to detect residual debris. In addition, the glazing on the pans can wear off so a lack of luminescence can also indicate that a pan needs to be re-glazed. In either case, this feature makes it easier to identify pans that need to diverted from service by detecting pans that have areas with a lack of luminescence.

This pivoting feature of diversion conveyor 88 is illustrated in FIGS. 10*b* and 10*c*. For ferrous pans diversion conveyor 88 and take-away conveyor 90 can use magnets and gription material to hold the pans on the conveyor belts, even when diversion conveyor 88 is tilted downwards to align with another take-away conveyor (not shown).

Figure 11:
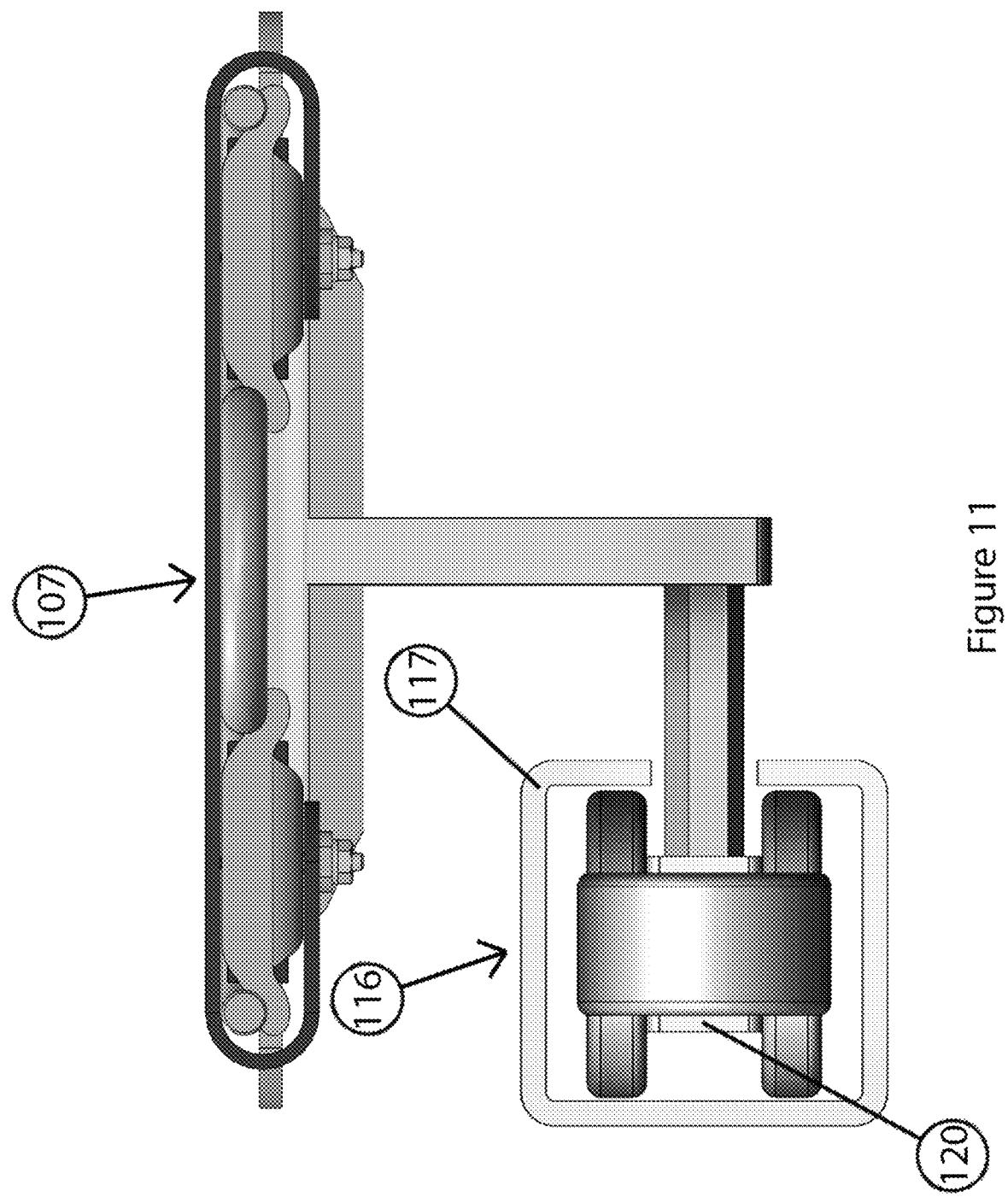
FIG. 11 is a cross-section view that shows an embodiment of a carriage that is guided by a single track.

FIG. 11 is a cross-section view of an alternative embodiment for a track system that has only one track 117. This non-limiting alternative demonstrates that the disclosed concept is not limited to track systems that use two tracks, but other track systems with one or more tracks can be employed with the disclosed pan cleaning machine. This cross section shows bogie wheel assembly 116 that can have eight bogie wheels similar to the two-track arrangement shown in other embodiments (with only four of the wheels shown in this cross section). Bogie wheel assembly 116 is positioned inside the hollow space defined by square/rectangular track 117. Transmission chain 120 is also disposed inside this hollow space and is connected to bogie wheel assembly 116 for pulling carriage 107. Bogie wheel assembly 116 can comprise springs (not shown) or the support arms for the wheels can be made as spring arms for urging the bogie wheels into contact with the interior walls of track 117 and such springs can deflect so that in combination with the pivoting movements between the components of bogie wheel assembly 116, bogie wheel assembly 116 can change in shape to move through the hollow channel as carriage 107 is pulled through the twists and turns of track 117 to manipulate the orientation of pans being pulled through the pan cleaning machine.

While the illustrated embodiments show particular examples, various modifications and alterations can be made to the examples within the scope of the disclosed concept and aspects of the different examples can be combined in different ways to achieve further examples. The term "pan" in the context of this disclosure will be understood to mean all types of baking pans used in high volume commercial production of baked goods, including, but not limited to flat pans, flat pans with lipped edges, baking pans with recessed areas, for example, for making cupcakes, bread loaves, cakes, and brownies. While bakeries use metal pans and can benefit from the disclosed automated metal pan cleaning machine and method, pans that require cleaning are also used in other commercial and industrial processes, for example, for the production of other food products, pharmaceuticals, and metal molds for manufacturing other products. The disclosed automated pan cleaning machine and method can be applied to any manufacturing process that uses pans or like apparatus that need to be cleaned of deposits or other debris left on the pans during the production process. While baking pans are commonly made from ferrous metals that can be captured onto the carriages by magnetic forces, clamps, or pins in receiving holes, or tabs in receiving slots, or other mechanical or non-mechanical attachment means can be employed to hold a pan onto a carriage during the cleaning process. Accordingly, the scope of this disclosure is to be understood from the entirety of the present disclosure in view of, but not limited to the embodiments illustrated and described herein. That is, with the benefit of the teachings of this disclosure it will be apparent that various modifications and variations can be made without departing from the spirit or scope of the disclosed concepts.

What is claimed is:

1. A pan cleaning system, comprising:
   a machine control system;
   a plurality of modular pan cleaning assemblies;
   a cleaning section having an at least one swing arm, whereby the plurality of modular pan cleaning assemblies is mounted in the cleaning section on the at least one swing arm and a stream of unclean pans passes within the cleaning section;
   an at least one sensor detecting an at least one variable of the unclean pans in the cleaning section and reporting the at least one variable to the machine control system; and
   an at least one swing arm actuator coupled to and controlled by the machine control system, wherein the at least one of the plurality of modular pan cleaning assemblies are selectively engaged by the movement of the swing arm to the stream of unclean pans to engage during operation with the stream of unclean pans by the machine control system activating the at least one swing arm actuator to move and selectively engage the stream of unclean pans with the at least one of the plurality of modular pan cleaning assemblies.

2. The pan cleaning system of claim 1, wherein the plurality of modular pan cleaning assemblies have an at least one set of brushes.

3. The pan cleaning system of claim 2, wherein in the plurality of modular pan cleaning assemblies with the at least one set of brushes, each of the at least one set of brushes has a predetermined motion.

4. The pan cleaning system of claim 3, wherein said predetermined motion is at least one of an orbital, reciprocating, vibrating, and a combination of orbital, reciprocating, and vibrating.

5. The pan cleaning system of claim 2, wherein the machine control system removes from service one or more of the plurality of modular pan cleaning assemblies determined to not be required for the cleaning of the stream of unclean pans based on the at least one variable.

6. The pan cleaning system of claim 2, wherein the at least one sensed variable is at least one of a height of the pans in the stream of unclean pans and the machine control system adjusts the distance of the plurality of modular pan cleaning assemblies engaging the stream of pans so that a desired spacing is achieved between the stream of unclean pans and the engaged plurality of modular pan cleaning assemblies to avoid jamming the pan cleaning system or applying a specific pressure on the at least one set of brushes for cleaning.

7. The pan cleaning system of claim 1, wherein the at least one sensed variable is a variable representing a style of the stream of unclean pans such that the machine control system can enable an at least one pre-programmed cleaning routine.

8. The pan cleaning system of claim 7, wherein the at least one variable representing a style of pan in the stream of unclean pans indicates the stream of unclean pans has recessed pockets.

9. The pan cleaning system of claim 8, and at least one of the engaged plurality of modular pan cleaning assemblies includes a brush plate unit having an orbital movement.

10. The pan cleaning system of claim 2, wherein the at least one sensor is at least one of an optical sensor, a magnetic sensor, a mechanical or strain-type sensor.

11. The pan cleaning system of claim 10, wherein the at least one variable is at least one of: a pan height of a pan in the stream of unclean pans, a pressure exerted by an engaging modular pan cleaning assembly from the plurality of modular pan cleaning assemblies, a pressure exerted on the at least one set of brushes, and a weight of a pan in the stream of pans.

12. The pan cleaning system of claim 1, further comprising a code reader, wherein the at least one variable is encoded on a pan in the stream of unclean pans as encoded data and the code reader is adapted to read the encoding on the pan in the stream of unclean pans and report the encoded data to the machine control system so that the machine control system can engage a pre-programmed cleaning routine selected based on the encoded data and thereby select which of the plurality of modular pan cleaning assemblies are activated by the at least one actuator to clean the pan in the stream of unclean pans within the cleaning section.

13. The pan cleaning system of claim 1, wherein at least one modular pan cleaning assembly of the plurality of modular pan cleaning assemblies comprises a brush plate mechanism that further comprises a field of bristles attached to a brush base that moves in a plane parallel to a baking surface plane on the pans of the stream of unclean pans.

14. The pan cleaning system of claim 13, wherein the at least one brush plate mechanism is equipped with bristles of different lengths so that the surface plane of the pan in the stream of unclean pans are cleaned.

15. The pan cleaning system of claim 13, further comprising at least one air knife and wherein the machine control system is adapted to further control the operation of the air knife.

16. The pan cleaning system of claim 1, further comprising a quick release coupling coupling an at least one modular pan cleaning assembly of the plurality of modular pan cleaning assemblies with an at least one set of brushes or a brush plate in the plurality of modular pan cleaning assemblies.

17. The pan cleaning system of claim 1, further compromises an at least one further sensor, the at least one further sensor detecting when an unclean pan in the stream of pans has not been properly cleaned.

18. The pan cleaning system of claim 17, wherein when the sensor detecting when the unclean pan in the stream of pans has not been properly cleaned detects the unclean pan in the stream of pans, the machine control system engages a diversion conveyor to remove the unclean pan from the pan cleaning system.

19. The pan cleaning system of claim 1, further comprising a conveyor conveying the stream of unclean pans in the cleaning section.

20. The pan cleaning system of claim 1, wherein said machine control system is adapted to activate the at least one swing arm actuator to move and engage the stream of unclean pans by selectively engaging the stream of unclean pans with one or more of the plurality of modular pan cleaning assemblies based on the at least one variable sensed by the at least one sensor.

* * * * *